US009294650B2

United States Patent
Takamori et al.

(10) Patent No.: US 9,294,650 B2
(45) Date of Patent: Mar. 22, 2016

(54) IMAGE READING APPARATUS

(71) Applicant: PFU Limited, Ishikawa (JP)

(72) Inventors: Masaya Takamori, Ishikawa (JP); Yuki Kasahara, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 14/495,630

(22) Filed: Sep. 24, 2014

(65) Prior Publication Data

US 2015/0381847 A1    Dec. 31, 2015

(30) Foreign Application Priority Data

Jun. 27, 2014   (JP) ................................. 2014-133312

(51) Int. Cl.
| | |
|---|---|
| G03B 15/03 | (2006.01) |
| H04N 1/04 | (2006.01) |
| G03B 15/05 | (2006.01) |
| H04N 1/00 | (2006.01) |

(52) U.S. Cl.
CPC ................. *H04N 1/04* (2013.01); *G03B 15/05* (2013.01); *H04N 1/00307* (2013.01); *H04N 1/00567* (2013.01); *H04N 2201/0096* (2013.01)

(58) Field of Classification Search
CPC ...... G03B 15/02; G03B 15/03; G03B 15/041; G03B 15/0442; H04N 1/04; H04N 5/2256; G06T 1/00; G06T 1/0007
See application file for complete search history.

(56) References Cited

U.S. PATENT DOCUMENTS

| | | | | |
|---|---|---|---|---|
| 4,669,031 A | * | 5/1987 | Regester | 361/16 |
| 7,978,970 B2 | * | 7/2011 | Pastore | 396/155 |
| 2005/0134692 A1 | * | 6/2005 | Izumi | 348/207.99 |
| 2011/0142371 A1 | | 6/2011 | King et al. | |
| 2014/0028867 A1 | * | 1/2014 | Erickson | 348/222.1 |

FOREIGN PATENT DOCUMENTS

| | | |
|---|---|---|
| EP | 2 566 146 A1 | 3/2013 |
| JP | H09-233265 A | 9/1997 |
| JP | 2000-013665 A | 1/2000 |

(Continued)

OTHER PUBLICATIONS

Japanese Notice of Rejection issued in corresponding Japanese Patent Application No. 2014-133312 mailed on Mar. 17, 2015; 3 pages with English translation.

(Continued)

*Primary Examiner* — WB Perkey
(74) *Attorney, Agent, or Firm* — McDermott Will & Emery LLP

(57) ABSTRACT

An image reading apparatus includes a casing configured to cut off ambient light and have a casing-opening portion at the bottom, an image capturing unit configured to perform image capturing of a medium that is exposed to an inside of the casing in the casing-opening portion, a plurality of light sources configured to be arranged on the inside of the casing and emit light to different areas on horizontal plane in the casing-opening portion, a control unit configured to control at least the image capturing unit and the plurality of light sources, and an attachment configured to be detachably attached to the bottom of the casing. The attachment surrounds the casing-opening portion in a state in which the attachment is attached to the casing and cuts off the ambient light together with the casing in a state in which the bottom is placed on the medium.

7 Claims, 16 Drawing Sheets

(56) References Cited

FOREIGN PATENT DOCUMENTS

| | | |
|---|---|---|
| JP | 2001-268323 A | 9/2001 |
| JP | 2002-010111 A | 1/2002 |
| JP | 2002-199253 A | 7/2002 |
| JP | 2009-284455 A | 12/2009 |
| JP | 2013-097732 A | 5/2013 |

OTHER PUBLICATIONS

Decision of a Patent Grant issued in corresponding Japanese Patent Application No. 2014-133312, issued on Dec. 15, 2015; with English translation.

* cited by examiner

IMAGE READING APPARATUS

CROSS-REFERENCE TO RELATED APPLICATIONS

The present application claims priority to and incorporates by reference the entire contents of Japanese Patent Application No. 2014-133312 filed in Japan on Jun. 27, 2014.

BACKGROUND OF THE INVENTION

1. Field of the Invention

The present invention relates to an image reading apparatus.

2. Description of the Related Art

There have been requests for converting a medium such as a single photograph including a silver-halide photograph generated by taking with a film camera, a printed photograph printed based on image data, or the like or a photograph album (photo album) in which a plurality of photographs are arranged as one into image data, and for storing and managing the converted image data on a recording medium such as a hard disk or a cloud. Generally, a medium is read by an image reading apparatus (a flatbed scanner, an auto document feeder (ADF) scanner, an overhead scanner, a handy scanner, or a digital camera), whereby image data is generated.

In the flatbed scanner, one or more single photographs or an area of a photograph album that includes at least a photograph desired to be read is placed on a platen glass, and an image capturing unit performs image capturing of a reading surface disposed on the platen glass side through the platen glass. In the ADF scanner, a plurality of single photographs can be consecutively imaged by an image capturing unit. In the overhead scanner (see Japanese Patent Application Laid-open No. 2001-268323) or the digital camera, one or more single photographs or an area of a photograph album that includes at least a photograph desired to be read is arranged within the image capture range of an image capturing unit, and the image capturing unit performs image capturing of a reading surface disposed on the side facing the image capturing unit. In the handy scanner (see U.S. Patent Publication No. 2011/0142371), the entire area of a single photograph or one photograph of a photograph album is captured by an image capturing unit, and accordingly, the handy scanner is moved while being brought into contact with the single photograph or the photograph album.

Now, it is desired that a damage of a medium be suppressed, the medium can be converted into image data in a simple manner, and the image data having high image quality is generated. In the flatbed scanner, the ADF scanner, the overhead scanner, or the like, a medium needs to be taken to a place at which the scanner is installed, and the medium needs to be arranged or devised such that image capturing of the medium can be performed in good way by the image capturing unit. For example, in the ADF scanner, in a case where a photograph included in a photograph album is to be converted into image data, the photograph is taken from the photograph album once. Particularly, in the case of a photograph album in which photographs are fixed using an adhesive, there are problems in that the photograph may be damaged at the time of peeling off the photograph, and the adhesive force of the adhesive is weakened by peeling off the photograph, which makes it difficult to attach the photograph to the photograph album again.

In addition, when using the ADF scanner, since a photograph is conveyed to the image capturing unit using conveyance rollers, there is a problem that the photograph may be damaged. Similarly, in the case of the handy scanner, the handy scanner is brought into contact with a medium, and accordingly, there is a problem in that the medium may be damaged.

When using the handy scanner, in a case where a single photograph is to be converted into image data, the photograph needs to be pressed by hand or the like such that the photograph is not moved. In addition, since the handy scanner is moved, a user has to perform a lot of operations, which makes the user feel bothersome. Furthermore, since the user moves the handy scanner with respect to the medium, a relative speed between the medium and the handy scanner is not constant, and it is difficult to maintain the image quality of the image data to be generated to be high.

When using the overhead scanner or the digital camera, since the single photograph(s) or the photograph album is exposed to an environment where the overhead scanner or the digital camera is arranged at the time of image capturing, the overhead scanner or the digital camera is influenced by the environment. A paper such as a printing sheet used for a silver-halide photograph or a glossy sheet used for photograph printing have reflectivity higher than that of a plain sheet, and accordingly, the ambient light emitted to the medium from the outside is reflected on the reading surface of the medium and is directly incident to the image capturing unit. As a result, there is a trouble according to an increase in the reflected light of the ambient light that is directly incident to the image capturing unit, in other words, a reflection of the ambient light occurs, and accordingly, it is difficult to maintain the image quality of the image data to be generated to be high.

SUMMARY OF THE INVENTION

It is an object of the present invention to at least partially solve the problems in the conventional technology.

According to an aspect of the invention, an image reading apparatus comprises a casing configured to cut off ambient light and have a casing-opening portion at the bottom, an image capturing unit configured to perform image capturing of a medium that is exposed to an inside of the casing in the casing-opening portion, a plurality of light sources configured to be arranged on the inside of the casing and emit light to different areas on horizontal plane in the casing-opening portion, a control unit configured to control at least the image capturing unit and the plurality of light sources, and an attachment configured to be detachably attached to the bottom of the casing. The attachment surrounds the casing-opening portion in a state in which the attachment is attached to the casing and cuts off the ambient light together with the casing in a state in which the bottom is placed on the medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, the present invention will be described in detail with reference to the drawings. However, the present invention is not limited to embodiments described below. In addition, in a constituent element of each embodiment described below, a member that can be easily considered by one skilled in the art or a member that is substantially the same is included.

First Embodiment

Figure 1:
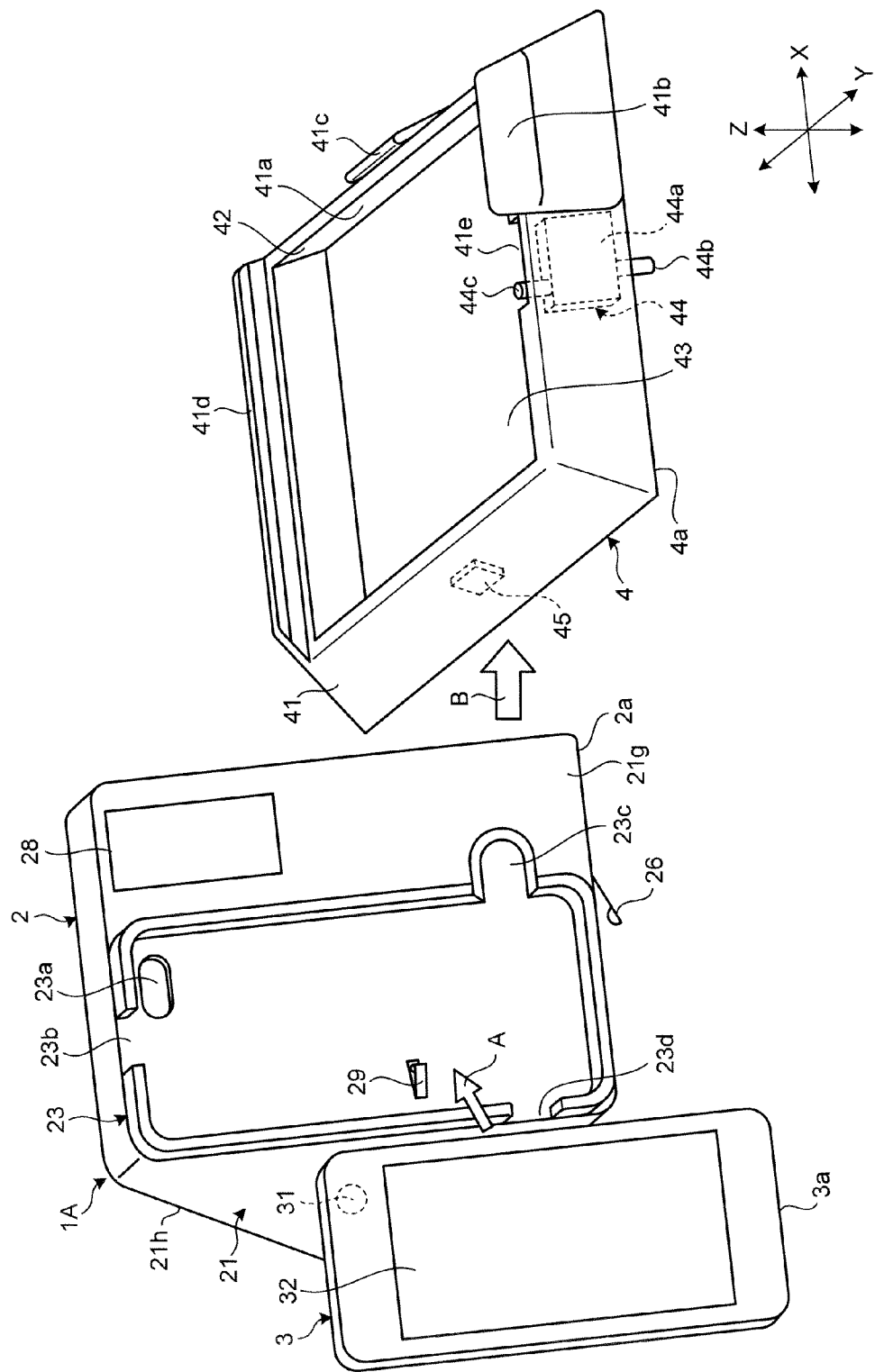
FIG. 1 is an external view of an image reading apparatus according to a first embodiment.
Figure 2:
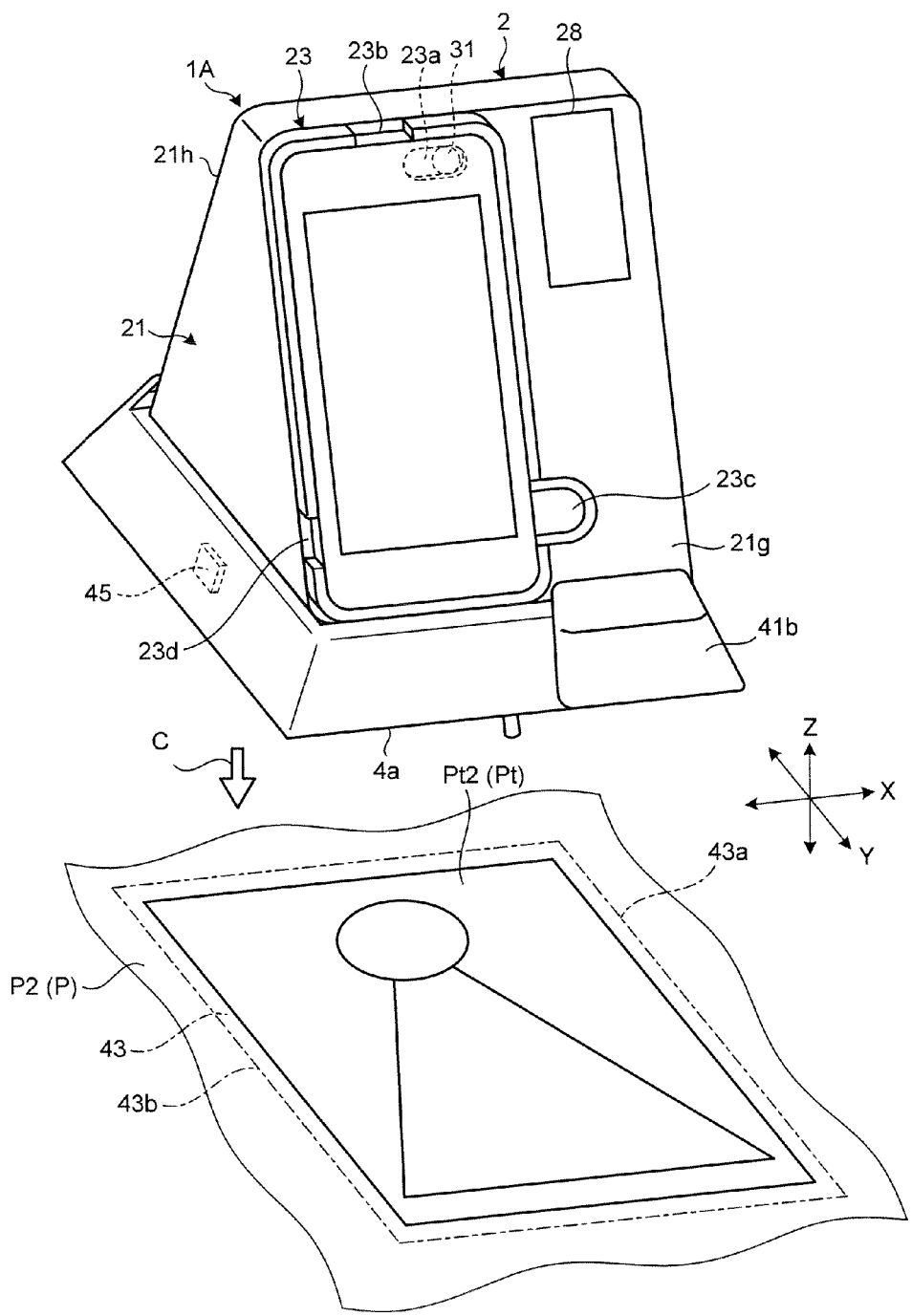
FIG. 2 is a diagram that illustrates an attachment-using state of the image reading apparatus according to the first embodiment.
Figure 3:
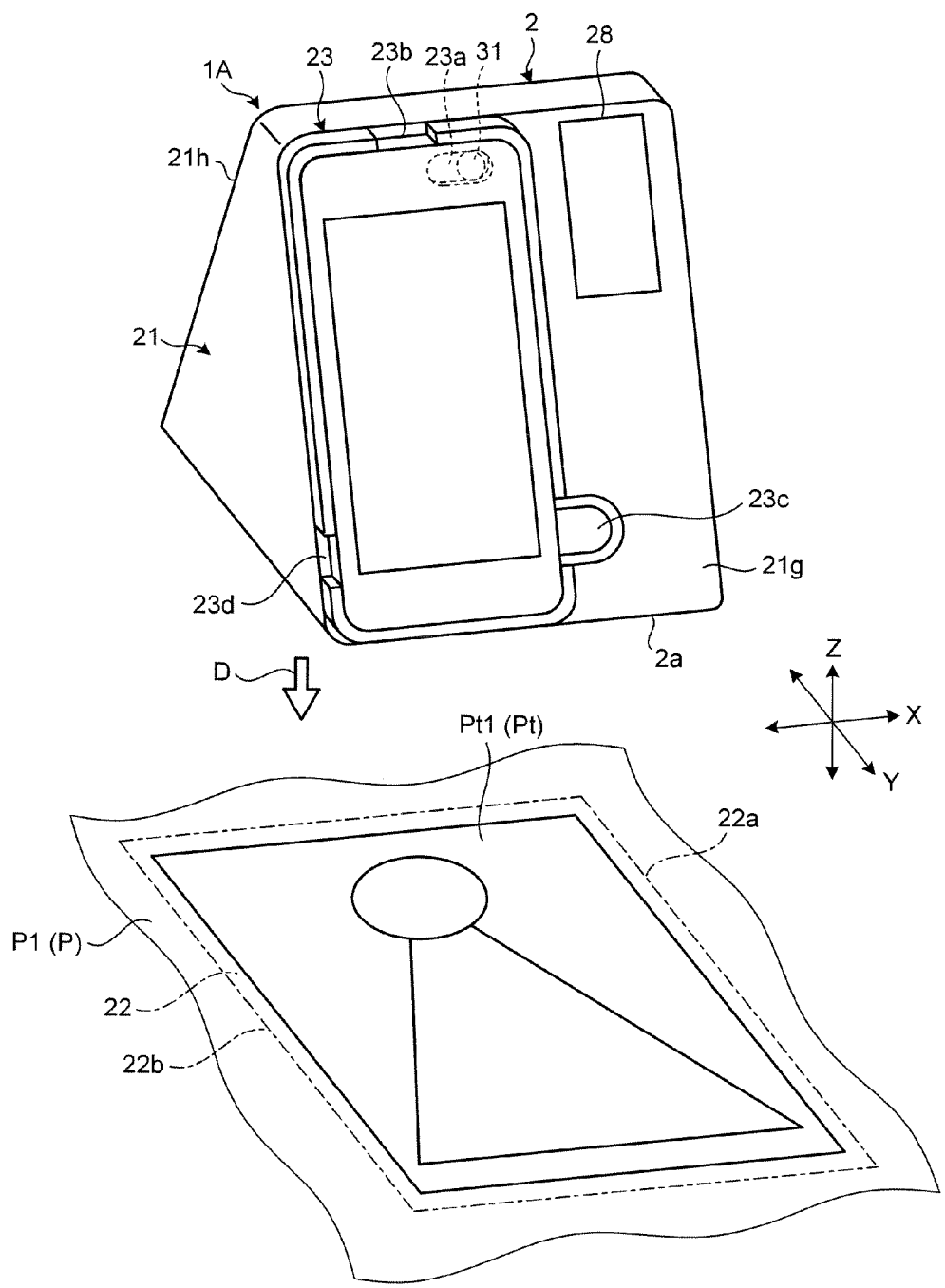
FIG. 3 is a diagram that illustrates an attachment-not-using state of the image reading apparatus according to the first embodiment.
Figure 4:
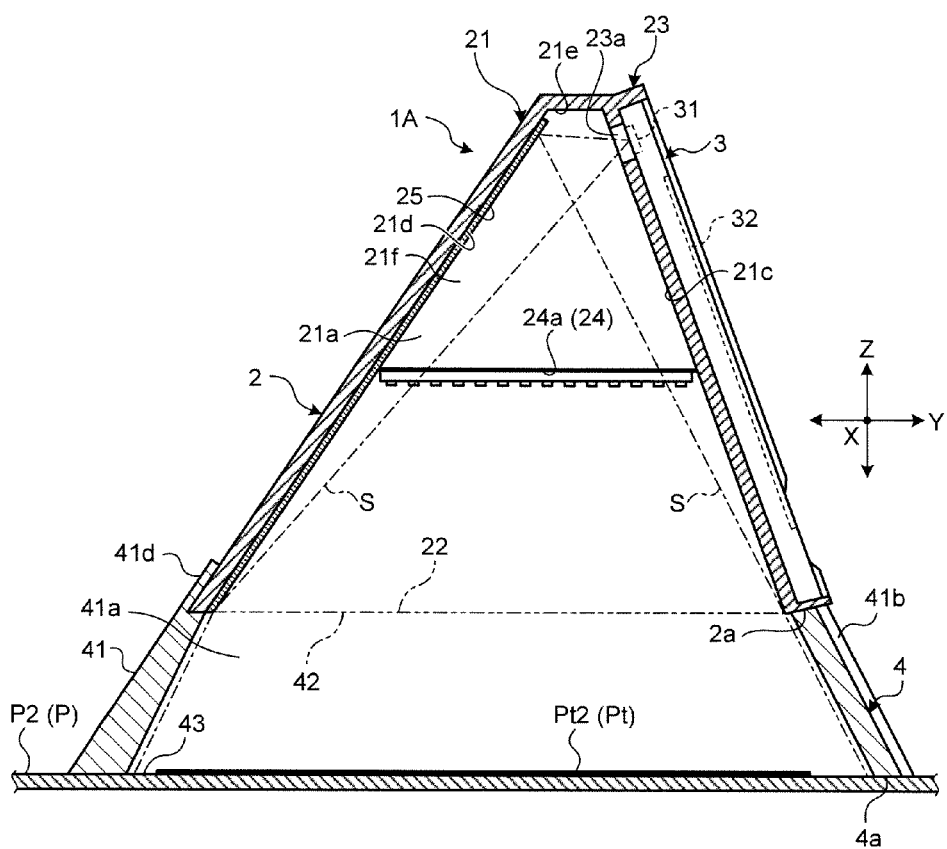
FIG. 4 is a cross-sectional view of the image reading apparatus in the attachment-using state.
Figure 5:
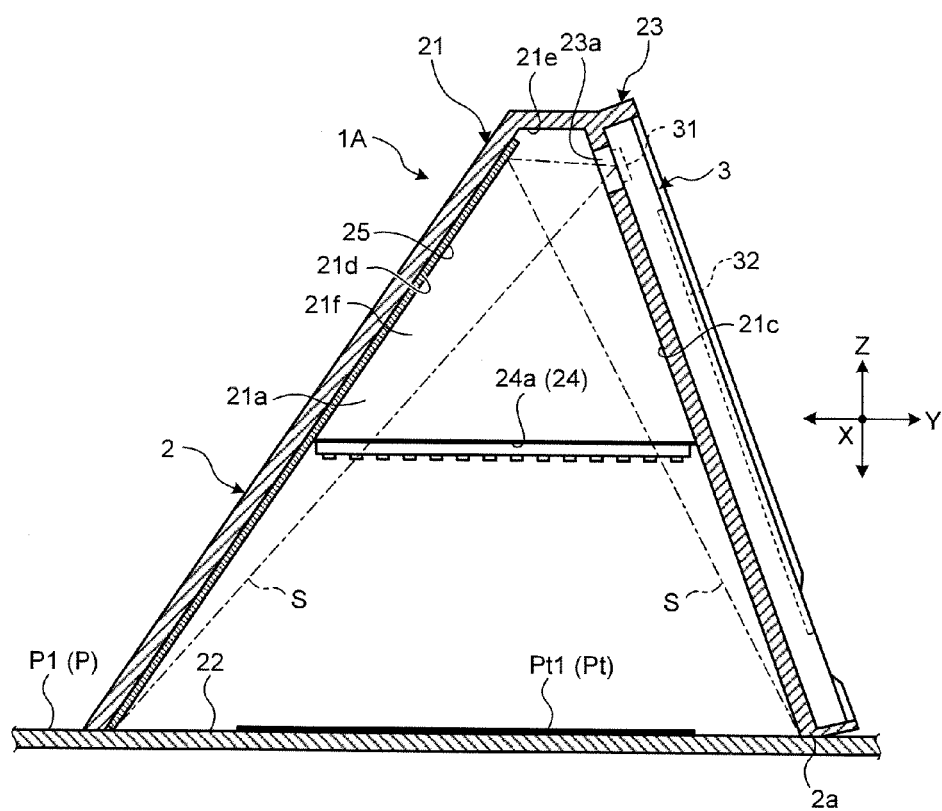
FIG. 5 is a cross-sectional view of the image reading apparatus in the attachment-not-using state.
Figure 6:
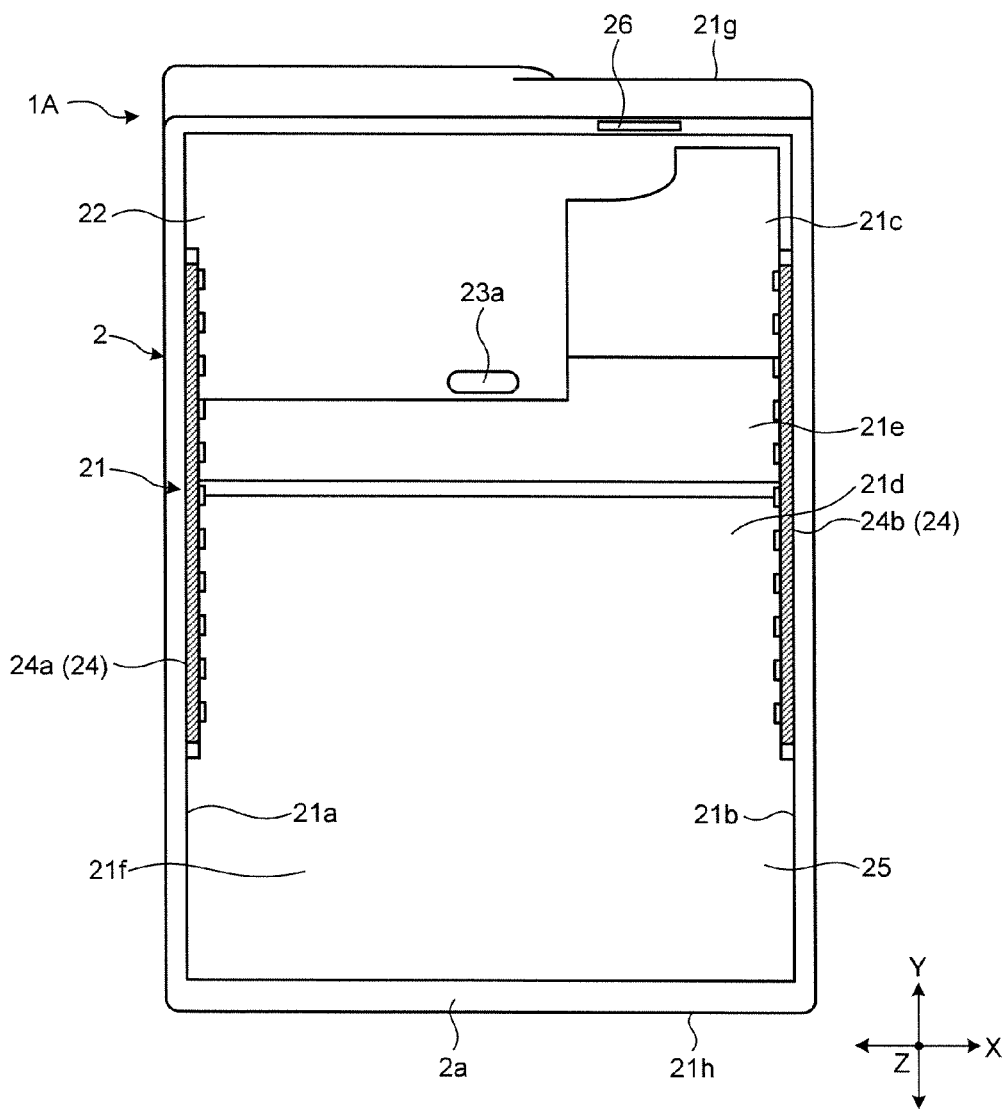
FIG. 6 is a bottom view of a casing.
Figure 7:
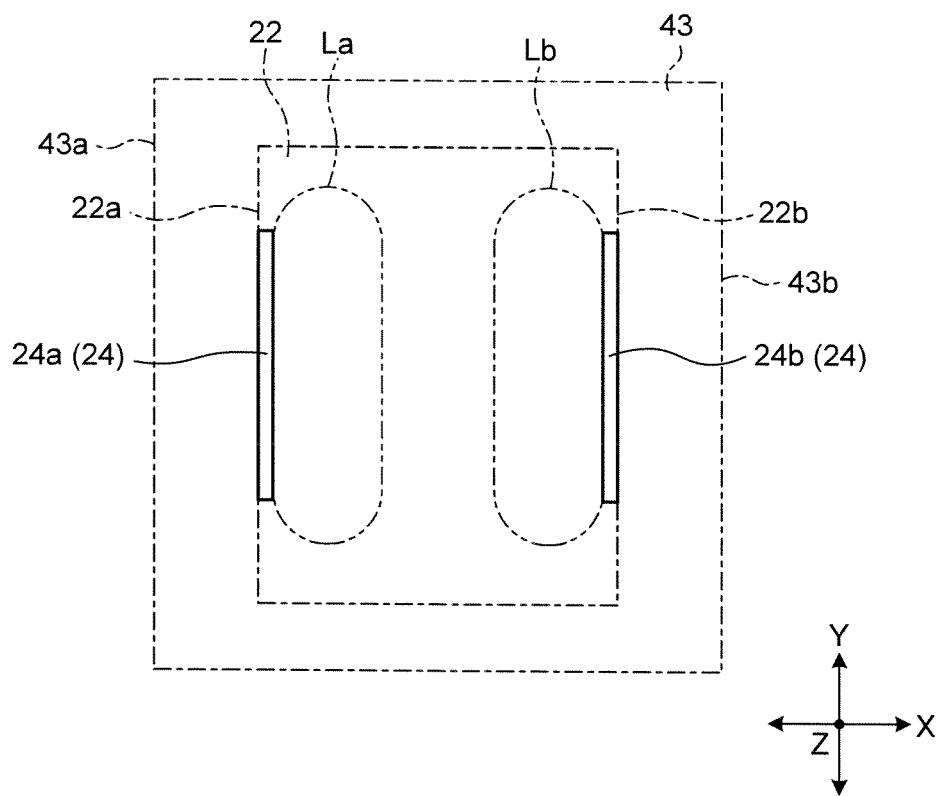
FIG. 7 is a diagram that illustrates a main irradiation region.
Figure 8:
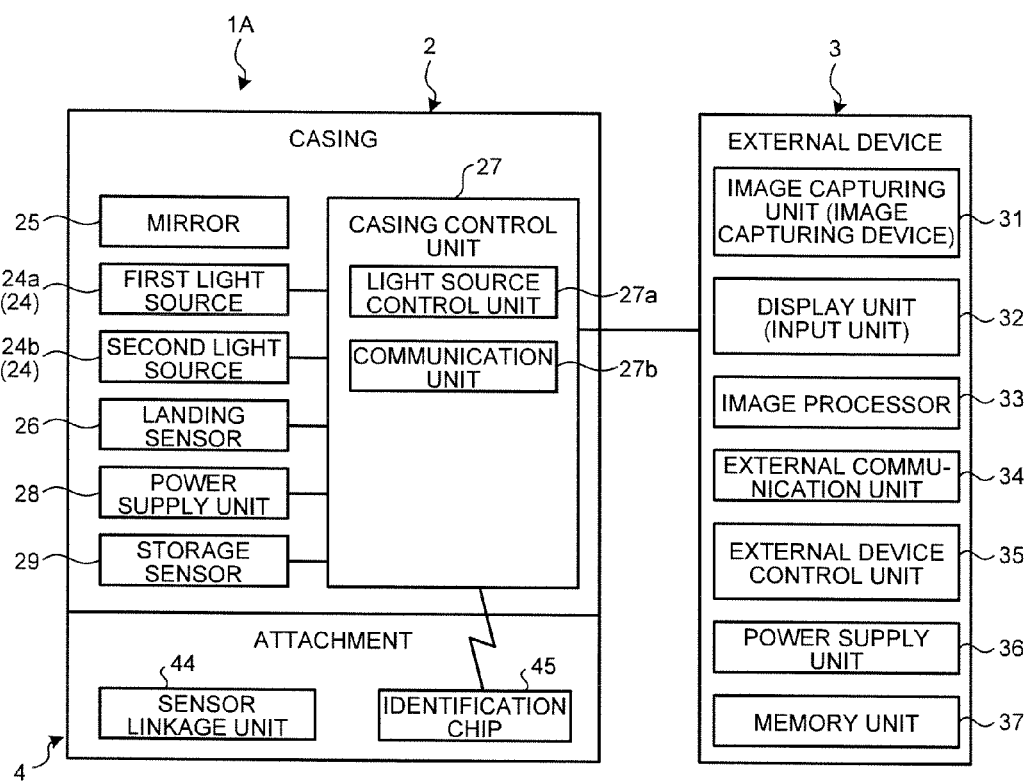
FIG. 8 is a diagram that illustrates an example of the schematic configuration of the image reading apparatus according to the first embodiment.

FIG. 1 is an external view of an image reading apparatus according to a first embodiment. FIG. 2 is a diagram that illustrates an attachment-using state of the image reading apparatus according to the first embodiment. FIG. 3 is a diagram that illustrates an attachment-not-using state of the image reading apparatus according to the first embodiment. FIG. 4 is a cross-sectional view of the image reading apparatus in the attachment-using state. FIG. 5 is a cross-sectional view of the image reading apparatus in the attachment-not-using state. FIG. 6 is a bottom view of a casing. FIG. 7 is a diagram that illustrates a main irradiation region. FIG. 8 is a diagram that illustrates an example of the schematic configuration of the image reading apparatus according to the first embodiment. Here, in each diagram, it is assumed that the X-axis direction is the width direction, the Y-axis direction is the depth direction, and the Z-axis direction is the height direction. FIG. 4 is a diagram that includes a cross-sectional view of a medium P2, a casing 2, and an attachment 4 viewed in the widthwise direction in a state in which an image reading apparatus 1A illustrated in FIG. 2 is placed on the medium P2. FIG. 5 is a diagram that includes a cross-sectional view of a medium P1 and the casing 2 viewed in the widthwise direction in a state in which the image reading apparatus 1A illustrated in FIG. 3 is placed on the medium P1.

The image reading apparatus 1A according to the first embodiment has a handheld size and, as illustrated in FIGS. 2 and 3, generates image data DP corresponding to the medium P by capturing an image of the medium P using an image capturing unit 31. The image reading apparatus 1A, as illustrated in FIG. 2, places the casing 2 that is in a state in which the attachment 4 is attached, i.e. the attachment-using state, on the medium P2 and captures an image of the medium P2 using the image capturing unit 31, thereby generating image data DP2 corresponding to the medium P2. In addition, the image reading apparatus 1A, as illustrated in FIG. 3, places only the casing 2 that is in a state in which the attachment 4 is detached, i.e. an attachment-not-using state on the medium P1 and captures an image of the medium P1 using the image capturing unit 31, thereby generating image data DP1 corresponding to the medium P1. The image reading apparatus 1A according to this embodiment sets a photograph album in which a silver-halide photographs or printed photographs are arranged as a medium P, reads a single photograph included inside the photograph album as a reading target area Pt, and generates image data DP that corresponds to the single photograph included inside the photograph album. However, the use of the image reading apparatus 1A according to this embodiment is not limited thereto. Thus, the image reading apparatus 1A may be used not only for a case where image data DP corresponding to a sheet having gloss (a single silver-halide photo, a single printed photograph, a magazine, or the like) is generated but also for a medium such as an image formed on a plain sheet, from which the user desires to generate the image data DP.

The image reading apparatus 1A, as illustrated in FIG. 1, includes the casing 2, an external device 3, and the attachment 4 and, as illustrated in FIG. 8, further includes a plurality of light sources 24, a light source control unit 27a, the image capturing unit 31, a display unit 32, and an external device control unit 35. In the image reading apparatus 1A according to this embodiment, the casing 2 includes the plurality of light sources 24 and the light source control unit 27a are included, and the external device 3 includes the image capturing unit 31, the display unit 32, and the external device control unit 35.

The casing 2 is formed for the external device 3 of which the external shape and the position of the image capturing unit 31 are provided or the external device 3 of which the external shape and the position of the image capturing unit 31 are within a predetermined range, for example, the external device 3 of the same series. The casing 2, as illustrated in FIGS. 4 and 5, cuts off ambient light and includes a casing-opening portion 22 at a bottom 2a, and the external device 3 can be attached to or detached from the casing 2. The casing 2 includes: a main body unit 21, the casing-opening portion 22; a storage portion 23, the plurality of light sources 24; a mirror 25; a landing sensor 26; a casing control unit 27; a power supply unit 28; and a storage sensor 29.

The main body unit 21 is formed by using a resin material (for example, a black synthetic resin) opaque to the ambient light, i.e. preventing the ambient light from being transmitted therethrough, and has a box shape that includes the casing-opening portion 22 at the bottom 2a. The main body unit 21, as illustrated in FIG. 6, forms the inner space, in other words, an inside 21f of the casing by using a pair of inner side faces 21a and 21b facing each other in the widthwise direction, a pair of an exposing face 21c and an opposing face 21d facing each other in the depth direction, a ceiling 21e, and the casing-opening portion 22. The inside 21f of the casing, as illustrated in FIGS. 4 and 5, when seen from the side of the inner side faces 21a and 21b, a gap of the pair of the exposing face 21c and the opposing face 21d, which face each other, of the main body unit 21 is formed to be enlarged toward the casing-opening portion 22. In other words, the inside 21f of the casing is formed in a trapezoid shape having the exposing face 21c and the opposing face 21d as inclined faces. In addition, the external shape of the main body unit 21, as illustrated in FIG. 1, has a trapezoid shape having an inclined face 21g corresponding to the exposing face 21c and an inclined face 21h corresponding to the opposing face 21d along the inside 21f of the casing.

As illustrated in FIG. 5, when the reading target area Pt1 of the medium P1 is covered with the casing 2, the casing-opening portion 22 overlaps the medium P1, thereby exposing the medium P1 to the inside 21f of the casing. The casing-opening portion 22 according to this embodiment is formed to have such an area that a photograph of the L size (89 mm×127 mm) can be fit into the inside of the casing-opening portion 22. In consideration of image processing to be described later, in a state in which the center of the photograph of the L size and the center of the casing-opening portion 22 coincide with each other, it is preferable the casing-opening portion 22 be configured such that an area, in which the margin between the outer edge of the casing-opening portion 22 and the outer edge of the photograph is formed is, for example, 102 mm×140 mm. The casing-opening portion 22 does not have a member that cuts off communication between the inside 21f of the casing and the outside.

The storage portion 23, as illustrated in FIG. 1, stores an external device 3 (arrow A in FIG. 1) and is formed on the outside of the casing 2. The storage portion 23 according to this embodiment is a frame member that can store the external device 3 therein and is formed on the inclined face 21g. The storage portion 23 is formed such that a gap is formed between the storage portion 23 and the stored external device 3, and thus, the stored external device 3 can be detached. Accordingly, the image capturing unit 31 and the display unit 32 are mounted to the external device 3, which is different from the casing 2, and can be attached to or detached from the casing 2. Since the storage portion 23 is formed on the inclined face 21g, positioning of the external device 3 with respect to the casing 2 can be performed making a bottom portion 3a (the opposite side to the side on which the image capturing unit 31 is formed in the vertical direction) of the stored external device 3 as a reference. In the storage portion 23, an image-capturing-opening portion 23a is formed. The image-capturing-opening portion 23a, as illustrated in FIGS. 4 and 5, is a through hole that penetrates through from the inclined face 21g to the exposing face 21c and is formed at a position facing the image capturing unit 31 of the external device 3 that is stored in the storage portion 23. In other words, the exposing face 21c of the casing 2 can expose the image capturing unit 31 of the external device 3 to the inside 21f of the casing. In addition, in the storage portion 23, notch portions 23b and 23d and a finger hole portion 23c that communicates with the space storing the external device 3 is formed. The notch portions 23b and 23d and the finger hole portion 23c, as illustrated in FIGS. 2 and 3, can expose the outer peripheral surface of the external device 3 to the outside of the storage portion 23 in a state in which the external device 3 is stored in the storage portion 23. Thus, the user can contact the external device 3 from at least one of the notch portions 23b and 23d and the finger hole portion 23c, and accordingly, the external device 3 can be easily detached from the storage portion 23.

The plurality of light sources 24, as illustrated in FIG. 6, are arranged on the inside 21f of the casing and emits light toward the casing-opening portion 22. The plurality of light sources 24 according to this embodiment are two light sources including a first light source 24a and a second light source 24b. Each of the first light source 24a and the second light source 24b is a light emitting module including a plurality of light emitting elements such as LEDs and LDs arranged in a strip and is turned on using the power supplied from the power supply unit 28. The first light source 24a and the second light source 24b are respectively disposed on the inner side faces 21a and 21b. The first light source 24a and the second light source 24b have a light amount for capturing the image of the entire area (an area including the reading target area Pt1) of the medium P1 exposed from the casing-opening portion 22 to the inside 21f of the casing in the attachment-not-using state, and the image of the entire area (an area including the reading target area Pt2) of the medium P2 that is exposed from a second opening portion 43, which will be described later, to the inside 21f of the casing through an inside 41a of the main body in the attachment-using state. The first light source 24a and the second light source 24b emit light to different areas on each of horizontal planes in the casing-opening portion 22 and the second opening portion 43. The first light source 24a has an optical axis on the side of the inner side face 21a in the casing-opening portion 22. The second light source 24b has an optical axis on the side of the inner side face 21b in the casing-opening portion 22. In other words, as illustrated in FIG. 7, in the attachment-not-using state, the first light source 24a and the second light source 24b respectively have main irradiation regions La and Lb on respective sides of a pair of sides facing each other in a horizontal plane formed at the casing-opening portion 22, that is, on the side of a side 22a corresponding to the inner side face 21a and the side of a side 22b corresponding to the inner side face 21b. In addition, in the attachment-using state, the first light source 24a and the second light source 24b respectively have main irradiation regions La and Lb on respective sides of the pair of sides facing each other, that is, on the side of a side 43a corresponding to the side 22a and the side of a side 43b corresponding to the side 22b in the horizontal plane formed at the second opening portion 43. Accordingly, the first light source 24a and the second light source 24b emit light such that the main irradiation regions La and Lb do not overlap each other on respective horizontal planes formed at the casing-opening portion 22 and at the second opening portion 43. Here, the main irradiation regions La and Lb represent areas to which light that is reflected on the medium P and is directly incident to the image capturing unit 31, in this embodiment, light incident through the mirror 25 among the light emitted from the first light source 24a and the second light source 24b. These regions are defined as areas where images of reflections of the first and second light sources 24a and 24b are captured in the generated image data DP, and thereby, in areas of the medium P1 or P2 corresponding to the areas where the reflections have occurred, neither image of the medium P1 nor P2 can be identified.

The mirror 25, as illustrated in FIGS. 4 and 5, enables the image capturing unit 31 to capture the image of the medium P1 that is exposed to the inside 21f of the casing in the casing-opening portion 22 or the image of the medium P2 that is exposed to the inside 21f of the casing through the inside 41a of the main body in the second opening portion 43. The mirror 25 is disposed on the opposing face 21d that faces the exposing face 21c on which the image capturing unit 31 is exposed. The positional relation (including angles with respect to the horizontal plane of the casing-opening portion 22) among the image capturing unit 31, the mirror 25, and the casing-opening portion 22 is set such that the image capture range S (see a dot and dash line in the figure) of the image capturing unit 31 through the mirror 25 has an area that is equal to or larger than the casing-opening portion 22 and the second opening portion 43. In other words, the image capturing unit 31 can capture the images of the entire areas of the medium P1 that is exposed to the inside 21f of the casing in the casing-opening portion 22 and the medium P2 that is exposed to the inside 21f of the casing in the second opening portion 43 through the inside 41a of the main body. In addition, since the image of the medium P1 or P2 is captured through the mirror 25 by the image capturing unit 31, the position of the image capturing unit 31 with respect to the casing-opening portion 22 and the second opening portion 43 is not uniquely determined based on the image capture range S of the image capturing unit 31. Accordingly, the position of the image capturing unit 31 in the casing 2 and the attachment 4 can be arbitrarily determined, whereby the sizes of the casing 2 and the attachment 4 can be suppressed. In addition, since the storage position of the external device 3 with respect to the casing 2 can be arbitrarily determined, the storage portion 23 that stores the external device 3 can be formed at a position determined in consideration of the facility of the attachment/detachment of the external device 3 to/from the casing 2.

The landing sensor 26 is a blocking detection unit and detects blocking of the casing-opening portion 22. The landing sensor 26 according to this embodiment, as illustrated in FIGS. 1 and 6, is disposed at the bottom 2a of the casing 2. The landing sensor 26 is a mechanical sensor that is turned on as an arm is pressed by the medium P1 so as to be transformed when the bottom 2a of the casing 2 is brought into close contact with the medium P1, in other words, when the casing-opening portion 22 is closed by the medium P1.

The casing control unit 27, as illustrated in FIG. 8, controls each device included in the casing 2 and includes a light source control unit 27a and a communication unit 27b as the functions thereof. The light source control unit 27a performs drive control of the plurality of light sources 24 based on turning-on conditions of the first light source 24a and the second light source 24b, in other words, the amount of light, the turning-on timing and the like thereof, for example, performs the drive control based on the duty ratio. When the blocking of the casing-opening portion 22 is detected by the landing sensor 26 in the attachment-not-using state, or when the blocking of the second opening portion 43 is detected by the landing sensor 26 by means of a sensor linkage unit 44 to be described later in the attachment-using state, the light source control unit 27a according to this embodiment simultaneously turns on the first light source 24a and the second light source 24b. When a predetermined time elapses in the simultaneous turned-on state of the first light source 24a and the second light source 24b, the light source control unit 27a may simultaneously turn off the first light source 24a and the second light source 24b. Based on a light-source change-over signal supplied from the external device 3, the light source control unit 27a turns on only the first light source 24a, then, turns off the first light source 24a, turns on only the second light source 24b, and then, turns off the second light source 24b. The communication unit 27b electrically connects the casing 2 to the external device 3 and sends/receives information to/from an external communication unit 34. Here, the communication unit 27b and the external communication unit 34 exchange information therebetween by means of radio communication using a radio wave or the like.

In addition, the casing control unit 27 is electrically connected to the attachment 4 and acquires an identification number of the attachment 4 from an identification chip 45 of the attachment 4 to be described later. The communication unit 27b according to this embodiment operates the identification chip 45 using the radio wave as an energy source. Here, a range in which the communication unit 27b can set up a communication with the identification chip 45 is set such that a distance from the identification chip 45 to the communication unit 27b in the state in which the attachment 4 is attached to the casing 2 is a limit distance at which the communication can be set up. Accordingly, in a state in which the attachment 4 is detached from the casing 2, a distance from the identification chip 45 to the communication unit 27b exceeds the limit distance, and accordingly, a communication between the communication unit 27b and the identification chip 45 cannot be set up. In other words, in a case where the communication unit 27b is in the range in which a communication with the identification chip 45 can be set up, i.e. in a case where the identification number of the attachment 4 can be acquired by the casing control unit 27, a state is determined in which the attachment 4 is attached to the casing 2. On the other hand, in a case where the identification number of the attachment 4 cannot be acquired by the casing control unit 27, a state is determined in which the attachment 4 is detached from the casing 2. Accordingly, the casing control unit 27 can acquire the identification number of the attachment 4, thereby serving as an attachment state detecting unit that detects the attachment of the attachment 4 to the casing 2.

The power supply unit 28, as illustrated in FIG. 6, supplies power to each device included in the casing, in other words, the plurality of light sources 24 and the casing control unit 27. The power supply unit 28 according to this embodiment is a primary battery or a secondary battery.

The storage sensor 29 is a storage detecting unit and detects that the external device 3 is stored in the storage portion 23. The storage sensor 29 according to this embodiment, as illustrated in FIG. 1, is installed to the storage portion 23 and is a mechanical sensor that is turned on as an arm is pressed by the external device 3 so as to be transformed when the external device 3 is stored in the storage portion 23, in other words, when the storage portion 23 is blocked by the external device 3. Here, the storage sensor 29 is not limited to the mechanical sensor but may be an illuminance sensor that is turned on when the storage portion 23 is blocked by the external device 3 or the like.

The external device 3 is a device that is separate from the casing 2, and a reading application corresponding to the function of the image reading apparatus 1A is installed thereto from the time of the initialization (at the time of shipment from a factory) of the external device 3 or is read (including being downloaded) from a recording medium so as to be installed thereto. The external device 3 according to this embodiment is a mobile terminal such as a smartphone or a tablet that has the function of the image reading apparatus 1A as one function thereof and has the other functions such as a telephone function, and an Internet connection function or and like. The external device 3, as illustrated in FIGS. 1 and 8, is configured to include: the image capturing unit 31; the display unit 32; an image processor 33; the external communication unit 34; the external device control unit 35; a power supply unit 36, and a memory unit 37.

The image capturing unit 31, as illustrated in FIGS. 4 and 5, captures the image of the medium P1 that is exposed to the inside 21f of the casing in the casing-opening portion 22 or the medium P2 that is exposed to the inside 21f of the casing through the inside 41a of the main body in the second opening portion 43. The image capturing unit 31 is arranged on a rear face (a face located on the opposite side of a face on which the display unit 32 is disposed) of the external device 3, and image capturing devices such as CCD image sensors or CMOS image sensors driven by the power supplied from the power supply unit 36 are arranged in a planar shape therein. Each image capturing device outputs an image signal that is based on an output value corresponding to incident light to the image processor 33 for each exposure. In other words, the image capturing unit 31 captures the image of the medium P once by using the image capturing devices arranged in the planar shape. The image capturing unit 31 performs drive control of each image capturing device based on the image capture conditions of the image capturing device, in other words, exposure timing, an exposure time, and the like. The image capturing unit 31 exposes each image capturing device at the time of turning on the plurality of light sources 24. The image capturing unit 31 according to this embodiment continues to capture the image of the medium P1 or P2 in the simultaneous turned-on state of the first light source 24a and the second light source 24b. In addition, the image capturing unit 31 captures the image of the medium P1 or P2 once at each of the time of turning on only the first light source 24a and the time of turning on only the second light source 24b. In other words, at each image capturing operation using the image capturing unit 31, a light source (only the second light source 24b) other than a light source (only the first light source 24a) turned on at the previous image capturing operation is turned on among the plurality of light sources 24.

The display unit 32, as illustrated in FIG. 1, displays the image of the medium P1 or P2 captured by the image capturing unit 31. The display unit 32 is arranged on the front face of the external device 3 and is a display such as a liquid crystal display or an organic EL display driven by the power supplied from the power supply unit 36. The display unit 32, based on an image data signal output from the image processor 33, displays the image (an image corresponding to the medium P1 in a case where the medium P1 is exposed to the inside 21f of the casing in the casing-opening portion 22 or an image corresponding to the medium P2 in a case where the medium P2 is exposed to the inside 21f of the casing through the inside 41a of the main body in the second opening portion 43) captured by the image capturing unit 31. The display unit 32 according to this embodiment is a touch panel display having the function of an input unit in addition to the function of an output unit of the external device 3, and, as a user presses an arbitrary position on the touch panel display, an electric signal relating to the position is output to each device that configures the external device 3. In addition, when the reading application is executed, a shutter release button (hereinafter, shutter button) is displayed as an icon on the display unit 32. When the user presses the shutter button, an image capture instruction signal for giving an instruction for image capturing using the image capturing unit 31 is output from the external device control unit 35 to be described later to the image capturing unit 31, and an image capturing operation is performed by the image capturing unit 31.

Figure 9:
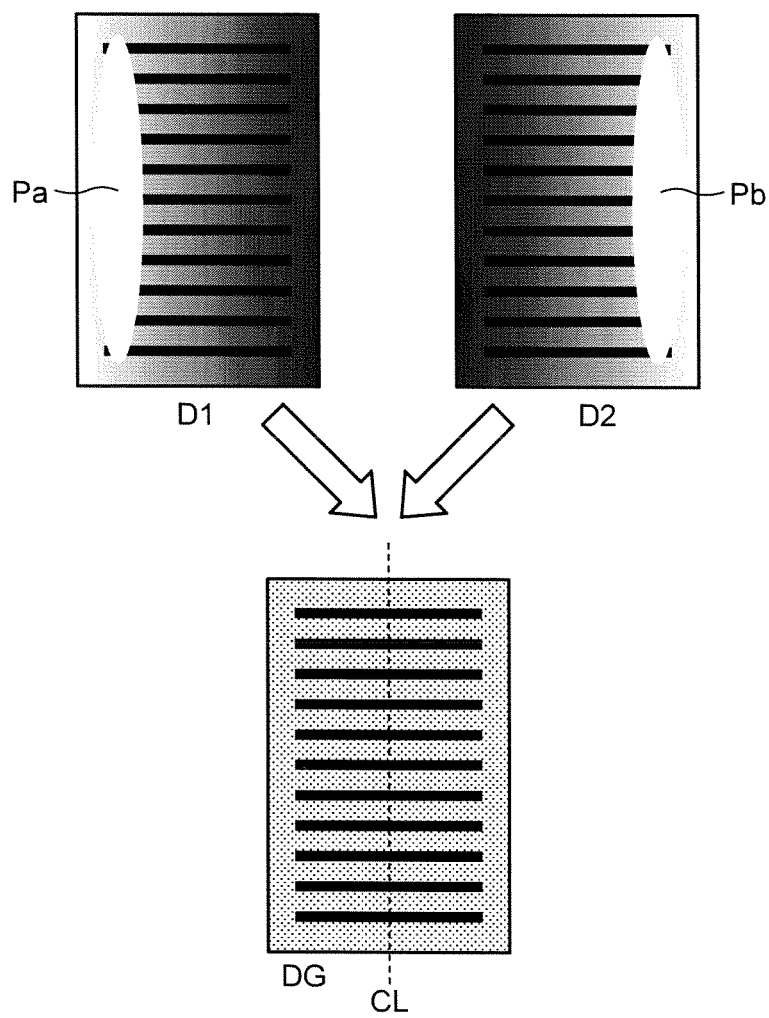
FIG. 9 is a diagram that illustrates composite image data.

The image processor 33 processes image data DP1 or DP2 corresponding to the medium P1 or P2 of which the image is captured by the image capturing unit 31. The image processor 33 captures the image capture range including the casing-opening portion 22 or the second opening portion 43 based on an image signal that is output from the image capturing unit 31, thereby generating the image data DP1 or DP2. Accordingly, when the casing-opening portion 22 and the second opening portion 43 are respectively closed by the medium P1 or the medium P2, the image data DP1 or DP2 corresponding to the medium P1 or P2 is respectively generated. In addition, the image processor 33, as illustrated in FIG. 9, generates composite image data DG, which is the image data DP, acquired by composing image data (first image data D1) generated by performing image capturing using the image capturing unit 31 at the time of turning on only the first light source 24a and image data (second image data D2) generated by performing image capturing using the image capturing unit 31 at the time of turning on only the second light source 24b. Since the first image data D1 is captured at the time of turning on only the first light source 24a, a reflection Pa of the first light source 24a occurs in an area corresponding to the main irradiation region La, and accordingly, image of area of the corresponding area of either medium P1 or P2 cannot be identified. In addition, since the second image data D2 is captured at the time of turning on only the second light source 24b, a reflection Pb of the second light source 24b occurs in an area corresponding to the main irradiation region Lb, and accordingly, image of area of the corresponding area of either medium P1 or P2 cannot be identified. Here, the reflections Pa and Pb occur at different positions in the image data DP. The reason for this is that the first light source 24a and the second light source 24b emit light to different areas on respective horizontal planes in the casing-opening portion 22 or the second opening portion 43. Accordingly, in the first image data D1, image of the area of the medium P1 or P2 corresponding to the area of the reflection Pb can be identified. In addition, in the second image data D2, image of the area of the medium P1 or P2 corresponding to the area of the reflection Pa can be identified. The image processor 33 extracts areas, where images in the area of the medium P1 or P2 can be identified, from the image data D1 and D2 and generates composite image data DG. The image processor 33 according to this embodiment sets a center line CL of the image data D1 and D2 positioned between both the reflections Pa and Pb included in the image data D1 and D2 as a boundary. The image processor 33 extracts, from the first image data D1, an area on the opposite side to the side where the reflection Pa occurs with respect to the center line CL, and from the second image data D2, an area on the opposite side to the side where the reflection Pb occurs with respect to the center line CL and composes the image data corresponding to the two extracted areas, thereby generating the composite image data DG. In other words, the generated composite image data DG is configured by only areas, which are included in the image data D1 and D2, having high image quality. The image processor 33 performs various corrections of the composite image data DG. The corrections include boundary smoothing, a mirroring correction, a perspective transform, rectangular cropping, and a gamma correction, which will be described later.

The external communication unit 34, as illustrated in FIG. 8, electrically connects the external device 3 to the casing 2 and sends information to or receives information from the communication unit 27b. The external communication unit 34 according to this embodiment outputs a light-source change-over signal to the communication unit 27b.

The external device control unit 35 controls devices that configure the external device 3 including the image capturing unit 31. In addition, the external device control unit 35 controls the plurality of light sources 24 by means of the light source control unit 27a. The external device control unit 35 executes the reading application described above, thereby realizing the image capturing of the medium P2 using the casing 2 in the attachment-using state and the external device 3, and realizing the image capturing of the medium P1 using the casing 2 in the attachment-not-using state and the external device 3. In addition, the external device control unit 35 serves as a tag information adding unit that adds tag information T to the image data DP generated by the image processor 33. Here, the tag information T includes image capture information that is information at the time of image capturing using the image capturing unit 31 and, for example, is resolution (dpi), an image capture size (size), an image capture range (mm), an exposure time (sec), a light amount (%), and the like.

The power supply unit 36 supplies power to each device included in the external device 3, in other words, the image capturing unit 31, the display unit 32, the casing control unit 27, and the like. The power supply unit 36 according to this embodiment is a secondary battery.

The memory unit 37 stores the reading application described above. The memory unit 37 according to this embodiment stores attachment information that is associated with an identification number (in a case where a plurality of types of attachments 4 are present, identification numbers corresponding to respective attachments 4) of the attachment 4. The attachment information is stored in the memory unit 37 from the time of initialization (at the time of shipment from a factory) of the external device 3 or is stored in the memory unit 37 by being read (including being downloaded) from a recording medium. Here, the attachment information according to this embodiment includes an image capture condition in the attachment-using state, a turn-on condition, information relating to a change from the image data DP captured and generated in the attachment-using state with respect to the image data DP captured and generated in the attachment-not-using state, and the like. The attachment information, for example, includes an exposure time, a light amount, resolution, an image capture size, an image capture range, and the like.

The attachment 4, as illustrated in FIG. 1, is detachably attached to the bottom 2a of the casing 2. One or a plurality of types of the attachments 4 are prepared in advance for the casing 2. The attachment 4 according to this embodiment sets the image capture range to be larger than the image capture range S of the image capturing unit 31 that is in the not-using-state of the attachment 4. The attachment 4 includes a main body unit 41, a first opening portion 42, the second opening portion 43, the sensor linkage unit 44, and the identification chip 45.

The main body unit 41 is formed by using a resin material (for example, a black synthetic resin) opaque to the ambient light, i.e. preventing the ambient light from being transmitted therethrough, and is formed in a frame shape in which the first opening portion 42 and the second opening portion 43 communicate with each other through the inside 41a of the main body. In the main body unit 41, the first opening portion 42 is formed on the upper side in the height direction, and the second opening portion 43 is formed on the lower side. The main body unit 41 is formed in the shape of a frustum of a quadrangular pyramid, and hook portions 41b, 41c, and 41d are formed on three sides out of four sides. The hook portions 41b, 41c, and 41d are formed to protrude from the first opening portion 42 toward the casing 2, in other words, toward the upper side in the height direction. Here, the hook portions 41b and 41d protrude toward the side of the first opening portion 42 so as to face the inclined faces 21g and 21h of the casing 2 in the attachment-using state. Accordingly, by horizontally moving (arrow B in FIG. 1) the casing 2 with respect to the attachment 4 from the side on which the hook portions 41b, 41c, and 41d are not formed until the hook portions 41b, 41c, and 41d face the outer peripheral surface, the attachment 4 is attached. In the attachment-using state, a relative movement of the attachment with respect to the casing 2 in the depth direction is regulated by the hook portions 41b and 41d, and a relative movement of the attachment with respect to the casing 2 in the width direction is regulated by the hook portion 41c. In the attachment-using state, in the main body unit 41, a notch portion 41e is formed at a position corresponding to the landing sensor 26 in the height direction. In the attachment-using state, the notch portion 41e prevents the landing sensor 26 from being pressed by the attachment 4 to be turned on. In other words, the landing sensor 26 is not turned on in the attachment-using state.

The first opening portion 42, in the attachment-using state, is formed to face the bottom 2a of the casing 2. The first opening portion 42, although not illustrated in the figure, faces the casing-opening portion 22 and has the same shape as the casing-opening portion 22. Accordingly, in the attachment-using state, the inside 41a of the main body communicates with the inside 21f of the casing. In other words, in the attachment-using state, the attachment 4 surrounds the casing-opening portion 22.

The second opening portion 43, as illustrated in FIG. 4, is formed at a bottom 4a. Accordingly, in the attachment-using state, when the bottom 4a is placed on the medium P2, the attachment 4 blocks the inside 41a of the main body and the inside 21f of the casing, thereby cutting off the ambient light together with the casing 2. The second opening portion 43 according to this embodiment is formed to be larger than the first opening portion 42 and is formed to have an area allowing a photograph of the 2 L size (178 mm×127 mm) to be placed within the second opening portion 43. In consideration of the image processing to be described later, in a state in which the center of the photograph of the 2 L size coincides with the center of the second opening portion 43, the second opening portion 43 preferably has an area for which a margin is formed between the outer edge of the second opening portion 43 and the outer edge of the photograph, for example, an area of 204 mm×140 mm. Here, the height of the attachment 4, in other words, a distance from the first opening portion 42 to the second opening portion 43 in the height direction is set based on an angle of view of the image capturing unit 31 and the area of the second opening portion 43. In a case where the angle of view of the image capturing unit 31 is constant, as the area of the second opening portion 43 is much larger than the area of the first opening portion 42, in other words, as the image capture range S in the attachment-using state increases, the height of the attachment 4 becomes higher. In other words, in order to realize a predetermined area of the second opening portion 43, the height of the attachment 4 is set to be lower as the angle of view of the image capturing unit 31 is larger, and the height of the attachment 4 is set to be higher as the angle of view is smaller.

The sensor linkage unit 44, in the attachment-using state, transmits the placement of the bottom 4a of the attachment 4 on the medium P2 to the landing sensor 26. The sensor linkage unit 44 includes a main body unit 44a, a medium-side transmission unit 44b, and a casing-side transmission unit 44c. The main body unit 44a mechanically transforms a vertical movement in the height direction of the medium-side transmission unit 44b into a vertical movement in the height direction of the casing-side transmission unit 44c. In other words, the main body unit 44a moves the casing-side transmission unit 44c to the upper side in a case where the medium-side transmission unit 44b moves to the upper side and moves the casing-side transmission unit 44c to the lower side in a case where the medium-side transmission unit 44b moves to the lower side. The medium-side transmission unit 44b is formed in a bar shape and is movably supported in vertical direction, i.e. upward and downward direction, with respect to the main body unit 44a. The medium-side transmission unit 44b is biased to the lower side by an elastic member not illustrated in the figure and protrudes to the lower side of the bottom 4a in a state in which no external force is applied thereto. In addition, the biasing force according to the elastic member is set such that the medium-side transmission unit 44b moves to the upper side in accordance with own weight of the casing 2 and the attachment 4 when the bottom 4a is placed on the medium P2. The casing-side transmission unit 44c is formed in a bar shape and is movably supported in vertical direction, i.e. upward and downward direction, with respect to the main body unit 44a. In a state in which no external force is applied to the medium-side transmission unit 44b, in other words, in a state in which the medium-side transmission unit 44b is located at the lowermost side, the casing-side transmission unit 44c is located at a position at which the landing sensor 26 is not pressed by the notch portion 41e, or at least the landing sensor 26 is not turned on. In other words, in the attachment 4, unlike the casing 2, the landing sensor 26 used for detecting the placement of the bottom 4a on the medium P2 does not need to be disposed. While two members including the medium-side transmission unit 44b and the casing-side transmission unit 44c have been described to be configured, the two members may be replaced with a single bar-shaped member.

The identification chip 45 stores an identification number of the attachment 4 in which the identification chip 45 is disposed. The attachment position of the identification chip 45 in the main body unit 41 is not particularly limited, as long as a communication with the communication unit 27b can be set up at the position where the identification chip 45 is attached. Accordingly, in the attachment 4, since there is no device requiring the supply of power, it is unnecessary to provide a power supply unit in the attachment 4, and power does not need to be supplied from the power supply unit 28 of the casing 2 to the attachment 4. Therefore, the attachment 4 can be formed to have a simple configuration.

Figure 10:
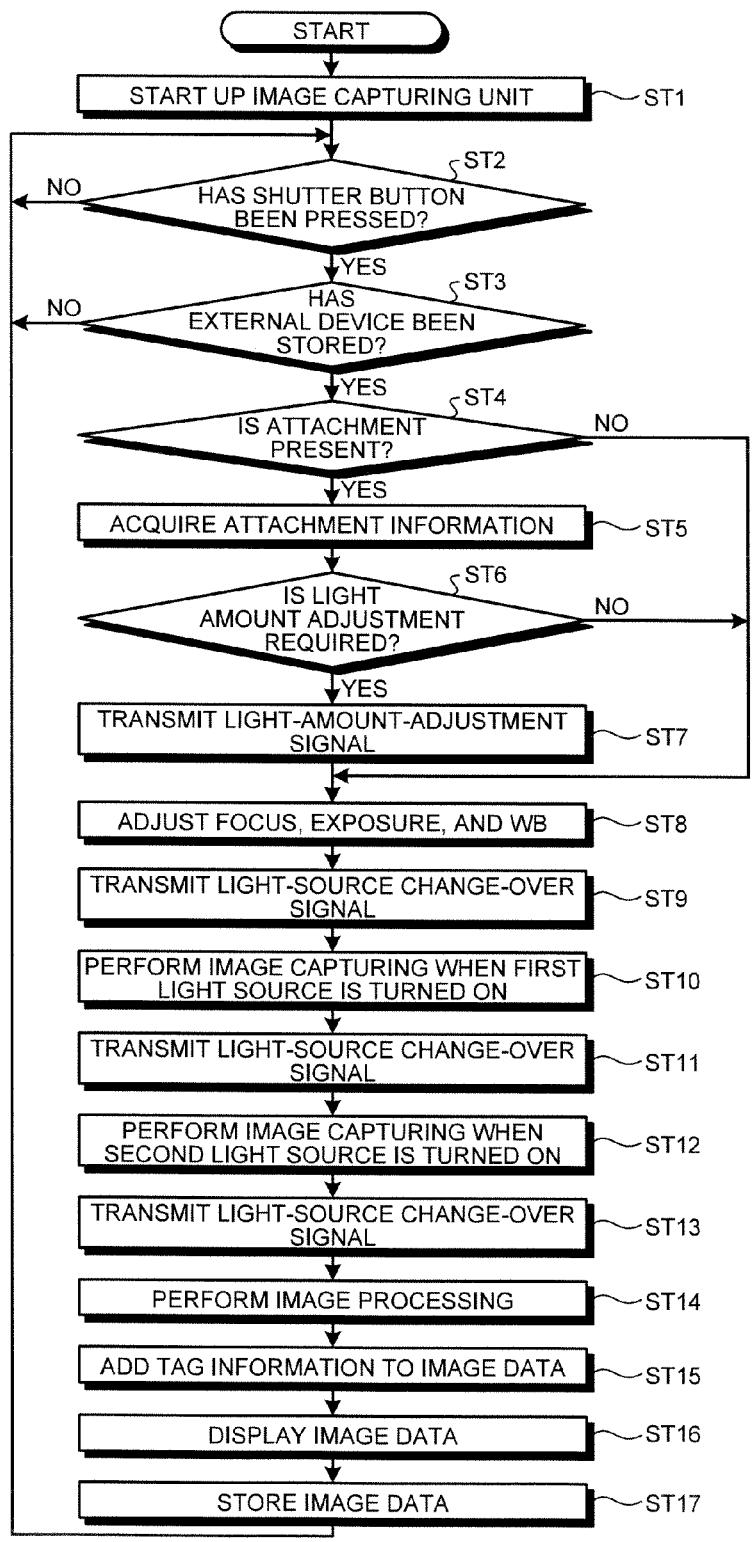
FIG. 10 is a flowchart that illustrates a reading operation performed by the image reading apparatus according to the first embodiment.
Figure 11:
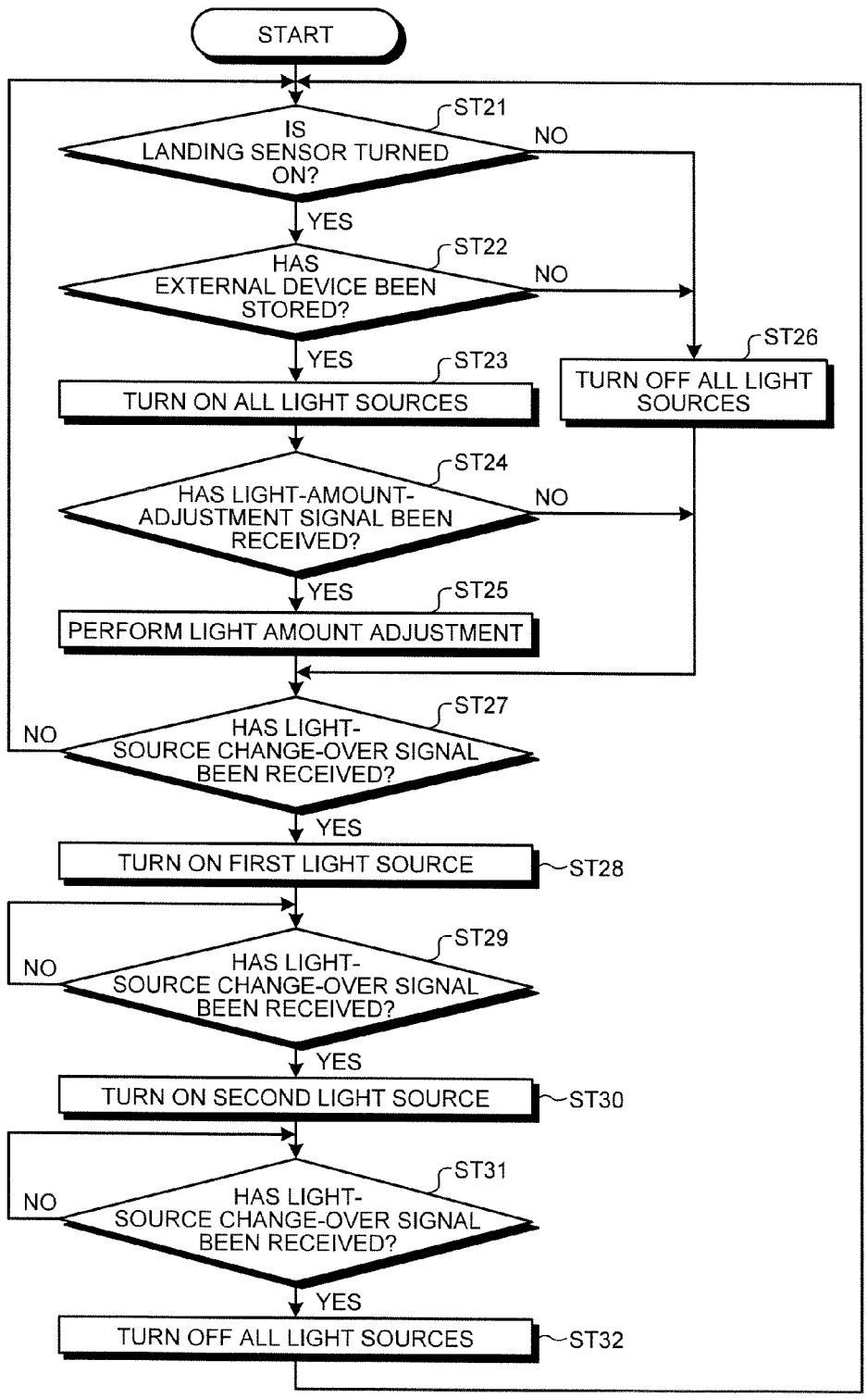
FIG. 11 is a flowchart that illustrates a reading operation performed by the image reading apparatus according to the first embodiment.
Figure 12:
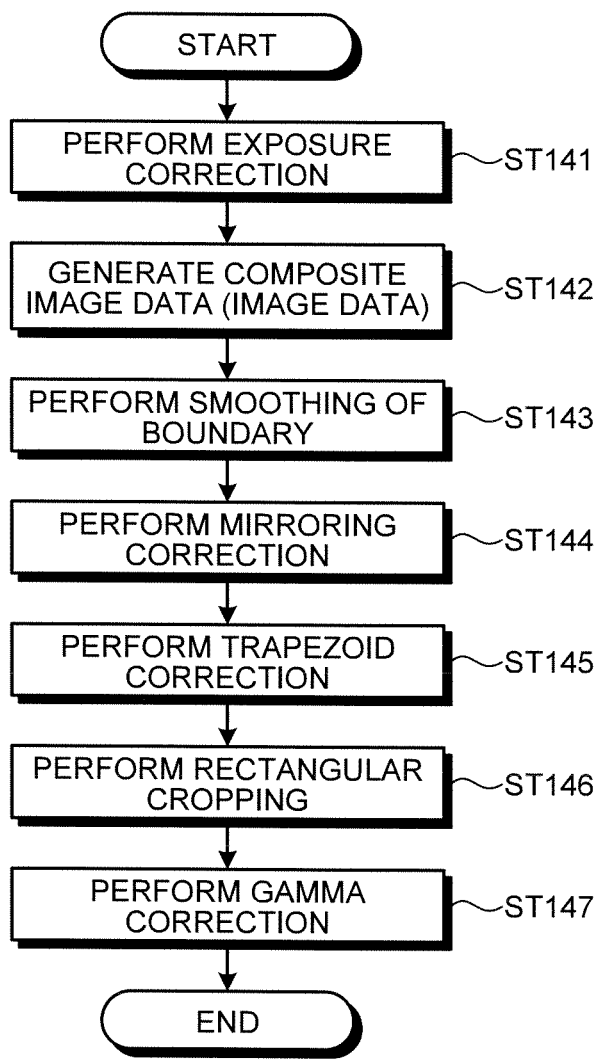
FIG. 12 is a flowchart that illustrates a reading operation performed by the image reading apparatus according to the first embodiment.
Figure 13:
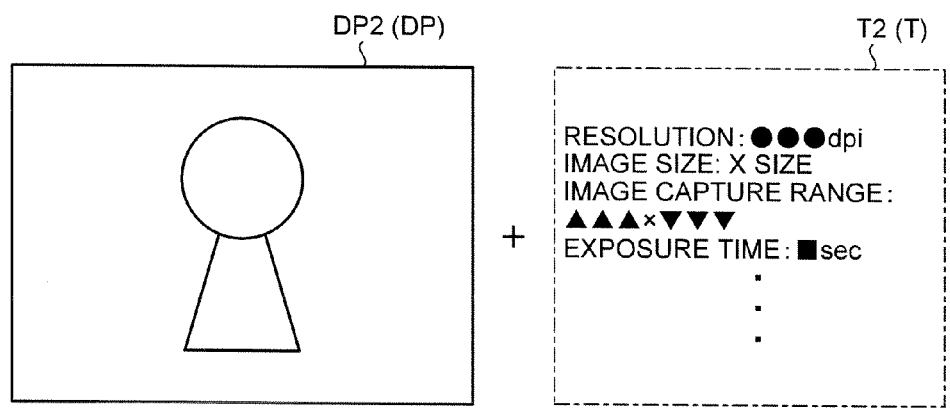
FIG. 13 is a diagram that illustrates image data generated in the attachment-using state.
Figure 14:
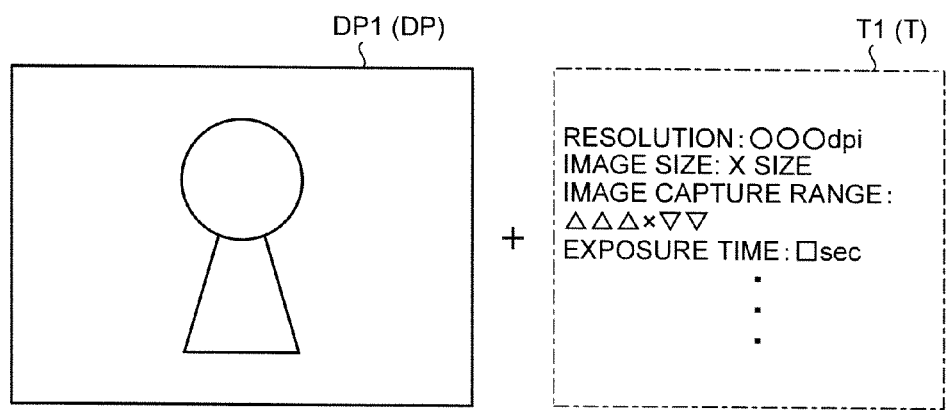
FIG. 14 is a diagram that illustrates image data generated in the attachment-not-using state.

Next, the reading of the media P1 and P2 that is performed by the image reading apparatus 1A according to this embodiment will be described. FIG. 9 is a diagram that illustrates composite image data. FIG. 10 is a flowchart that illustrates a reading operation performed by the image reading apparatus according to the first embodiment. FIG. 11 is a flowchart that illustrates a reading operation performed by the image reading apparatus according to the first embodiment. FIG. 12 is a flowchart that illustrates a reading operation performed by the image reading apparatus according to the first embodiment. FIG. 13 is a diagram that illustrates image data generated in the attachment-using state. FIG. 14 is a diagram that illustrates image data generated in the attachment-not-using state.

First, the user determines whether or not the attachment 4 is used. The user according to this embodiment performs a reading operation using the image reading apparatus 1A, in other words, performs image capturing using the image capturing unit 31 and determines the use or nonuse of the attachment 4 depending on the size of the reading target area Pt of the medium P for the medium P from which the user desires to generate the image data DP. The user uses the attachment 4, as illustrated in FIG. 2, in a case where the reading target area Pt does not fit into the inside of the casing-opening portion 22 of the casing 2 but enters into the second opening portion 43. However the user does not use the attachment 4, as illustrated in FIG. 3, in a case where the reading target area Pt enters into the inside of the casing-opening portion 22 of the casing 2.

Next, the user installs the external device 3 to the casing 2. Here, by storing the external device 3 in the storage portion 23, the storage sensor 29 is turned on.

Next, the user instructs the external device 3 to execute the reading application. Here, the instruction for the execution of the reading application, for example, is performed by the user by operating the touch panel of the display unit 32, making an icon for a start button corresponding to the reading application be displayed on the display unit 32, and pressing the start button. Here, the external communication unit 34 of the external device 3 according to this embodiment sets up a communication with the communication unit 27b of the casing 2 by executing the reading application. Either one of the user's installment of the external device 3 to the casing 2 and the instruction for the execution of the reading application may be performed first.

Next, the external device control unit 35, as illustrated in FIG. 10, starts up the image capturing unit 31 based on the user's instruction for the execution of the reading application of the external device 3 (Step ST1). Accordingly, the image capturing unit 31 is started up and continues to perform image capturing of the casing-opening portion 22, image signals are sequentially output to the image processor 33, the image processor 33 sequentially generates image data DP, and images based on the generated image data DP are sequentially displayed by the display unit 32. At this time, on the display unit 32, a shutter button is displayed as an icon together with the images. The external device control unit 35 repeats the determining (Step ST2) whether or not the shutter button has been pressed until the shutter button is pressed and waits for the pressing of the shutter button.

Next, the user, as illustrated in FIG. 2, confirms a medium 22 for which a reading process is desired to be performed in the attachment-using state and manually positions the image reading apparatus 1A with respect to the medium P2 such that the second opening portion 43 faces the reading target area Pt2 of the medium P2. Alternatively, the user, as illustrated in FIG. 3, confirms a medium P1 which the user desires to perform a reading process in the attachment-not-using state and manually positions the image reading apparatus 1A with respect to the medium P1 such that the casing-opening portion 22 faces the reading target area Pt1 of the medium P1. At this time, the plurality of light sources 24 are in the turned-off state. In addition, the casing control unit 27, as illustrated in FIG. 11, repeats determining (Step ST21) whether or not the landing sensor 26 has been turned on until the landing sensor 26 is turned on and waits until the landing sensor is turned on. Here, in the attachment-using state, the casing control unit 27 determines whether or not the landing sensor 26 has been turned on by means of the sensor linkage unit 44.

Next, the user, as denoted by arrow C illustrated in FIG. 2, lowers the image reading apparatus 1A that is in the attachment-using state toward the medium P2, and the attachment 4 is brought into close contact with the medium P2 (in a case where the medium P2 is smaller than the second opening portion 43, the bottom 4a of the attachment 4 is brought into close contact with a face on which the medium P2 is placed). Alternatively, the user, as denoted by arrow D illustrated in FIG. 3, lowers the image reading apparatus 1A that is in the attachment-not-using state toward the medium P1, and the casing 2 is brought into close contact with the medium P1 (in a case where the medium P1 is smaller than the casing-opening portion 22, the bottom 2a of the casing 2 is brought into close contact with a face on which the medium P1 is placed). At this time, since the plurality of light sources 24 are in the turned-off state, the inside 21f of the casing and the inside 41a of the main body are dark. Although the image capturing unit 31 sequentially captures the images of the medium P1 or P2 blocking the second opening portion 43 or the casing-opening portion 22, in the images of the medium P1 or P2 as sequentially captured, images of the medium P1 or P2 in the reading target area Pt1 or Pt2, which correspond to the images sequentially generated, cannot be recognized. Accordingly, also in the images that are based on the image data sequentially displayed on the display unit 32, the images in the reading target areas Pt1 or Pt2 cannot be recognized. On the other hand, since the attachment 4 is brought into close contact with the medium P2 so as to close the second opening portion 43, the landing sensor 26 that is in the attachment-using state is turned on by the sensor linkage unit 44. In addition, since the casing 2 is brought into close contact with the medium P1 so as to close the casing-opening portion 22, the landing sensor 26 that is in the attachment-not-using state is turned on.

Next, when the landing sensor is determined to be turned on (Yes in Step ST21), the casing control unit 27, as illustrated in FIG. 11, determines whether or not the external device 3 is stored in the storage portion 23 (Step ST22). Here, the casing control unit 27 determines whether the external device 3 with which the communication has been set up is in an image capturable state.

Next, in a case where the casing control unit 27 determines that the external device 3 is stored in the storage portion 23 (Yes in Step ST22), the casing control unit 27 turns on all the light sources (Step ST23). Here, in the state in which the external device 3 has already been stored in the storage portion 23, in a case where the blocking of the second opening portion 43 or the blocking of the casing-opening portion 22 is detected by the landing sensor 26, the light source control unit 27a turns on all of the plurality of the light sources 24. Since it is not clear whether the attachment 4 is used or not, the casing control unit 27 turns on all the light sources with a predetermined light amount which is appropriate for the image capturing unit to perform image capturing in the attachment-not-using state. For example, in a case where the predetermined light amount is 70%, the casing control unit 27 performs drive control of the first light source 24a and the second light source 24b so that the light amount is 70% based on a duty ratio. By turning on all the light sources, light emitted from the plurality of the light sources 24 is radiated to the inside 21f of the casing or is radiated to the inside 41a of the main body through the inside 21f of the casing, and the light emitted from the plurality of the light sources 24 is radiated to the medium P2 which is blocking the second opening portion 43 or the medium P1 which is blocking the casing-opening portion 22 directly or through the mirror 25. In other words, the display unit 32 displays images that are captured by the image capturing unit 31 in the turned-on state of the plurality of the light sources 24. When the image capturing unit 31 sequentially captures the medium P2 blocking the second opening portion 43 or the medium P1 blocking the casing-opening portion 22, in the images sequentially generated, the images of the medium P1 or P2 corresponding to the reading target area Pt1 or Pt2 can be recognized. Accordingly, in the images sequentially displayed on the display unit 32 based on the image data DP, the image in the reading target area Pt can be recognized. Accordingly, the user can adjust the positional relation between the medium P2 and the second opening portion 43 or the positional relation between the medium P1 and the casing-opening portion 22 based on the image displayed on the display unit 32, and thus, the reading target areas Pt1 and Pt2 can be respectively arranged within the second opening portion 43 and the casing-opening portion 22. In addition, while the reflections Pa and Pb occur in the image data DP, the positional relation between the medium P2 and the second opening portion 43 or the positional relation between the medium P1 and the casing-opening portion 22 can be recognized. In addition, as illustrated in FIG. 11, the light source control unit 27a repeats determining whether or not a light-amount-adjustment signal has been received (Step ST24) or determining whether or not a light-source change-over signal has been received (Step ST27) until the light-amount-adjustment signal or a first-light-source turning-on signal which will be described later is received and waits until the light-amount-adjustment signal or the first-light-source turning-on signal is received.

Next, as illustrated in FIG. 10, when the shutter button displayed on the display unit 32 is pressed by the user, the external device control unit 35 determines that the shutter button has been pressed (Yes in Step ST2) and determines whether or not the external device 3 is stored in the storage portion 23 (Step ST3). Here, the external device 3 determines whether or not the external device 3 with which the communication is set up is in the image capturable state by means of the casing control unit 27.

Next, in a case where the external device 3 is determined to be stored in the storage portion 23 (Yes in Step ST3), the external device control unit 35 determines whether or not the attachment 4 is present, in other words, whether or not the attachment 4 is attached (Step ST4). The external device control unit 35 according to this embodiment determines whether or not an identification number of the attachment 4 has been detected from the identification chip 45 by the casing control unit 27 based on an output signal output from the casing control unit 27 to the external device control unit 35.

Next, in a case where the attachment 4 is determined to be present (Yes in Step ST4), the external device control unit 35 acquires attachment information (Step ST5). Here, in the attachment-using state, the external device control unit 35 acquires the attachment information that corresponds to the identification number stored in the memory unit 37 based on the identification number output from the casing control unit 27.

Next, the external device control unit 35 determines whether or not light amount adjustment is necessary based on the acquired attachment information (Step ST6). Here, the external device control unit 35 determines whether or not a light amount (the light amount when the attachment 4 is used) included in the attachment information acquired is different from the above-described predetermined light amount in the attachment-not-using state.

Next, in a case where the external device control unit 35 determines the light amount adjustment is necessary (Yes in Step ST6), the external device control unit 35 transmits a light-amount-adjustment signal (Step ST7). Here, the external device control unit 35 outputs a light-amount-adjustment signal which makes the plurality of the light sources 24 have a light amount based on the attachment information to the light source control unit 27a of the casing 2 through the external communication unit 34 and the communication unit 27b. The light amount based on the attachment information has a value larger than the light amount in the attachment-not-using state, for example, 80%, because the attachment 4 broadens the image capture range S, and a distance between the plurality of the light sources 24 and the medium P2 is larger than a distance between the plurality of the light sources 24 that are in the attachment-not-using state and the medium P1. Accordingly, the light source control unit 27a, as illustrated in FIG. 11, determines that the light-amount-adjustment signal has been received (Yes in Step ST24) and adjusts the light amount to the light amount based on the attachment information (Step ST25).

Next, the external device control unit 35, as illustrated in FIG. 10, causes the image capturing unit 31 to adjust the focus, the exposure, the while balance (WB) (Step ST8). Here, the image capturing unit 31 adjusts the image capturing unit 31 in accordance with the environments of the inside 41a of the main body and the inside 21f of the casing, thereby performing the adjustment such that, in both of the image data D1 and D2, an optimal image quality can be acquired for the area disposed on the side opposite to the side where the reflections Pa and Pb occur. In addition, in a case where the light amount adjustment is determined to be unnecessary (No in Step ST6), the external device control unit 35 directly causes the image capturing unit 31 to adjust the focus, the exposure, and the white balance (WB). Accordingly, the light source control unit 27a, as illustrated in FIG. 11, determines that the light-amount-adjustment signal has not been received (No in Step ST24) and maintains the light amount in the attachment-not-using state. In addition, in a case where the attachment 4 is determined to be not present (No in Step ST4), the external device control unit 35 directly causes the image capturing unit 31 to adjust the focus, the exposure, and the white balance (WB). Accordingly, in the attachment-not-using state, the external device control unit 35 does not perform acquisition of the attachment information and light amount adjustment.

In addition, in a case where the landing sensor 26 is determined to be turned off (No in Step ST21) or in a case where the external device 3 is determined to be not stored in the storage portion 23 (No in Step ST22), the light source control unit 27a turns off all the light sources (Step ST26). In other words, in a case where the landing sensor 26 is turned off or in a case where the external device 3 is not stored in the storage portion 23, in other words, until a reading operation of the medium P performed by the image reading apparatus 1A is prepared, the light source control unit 27a does not turn on all the light sources. Accordingly, since all the light sources are turned on only when preparation of the reading operation of the medium P performed by the image reading apparatus 1A is completed, whereby the power consumption of the casing 2 can be suppressed.

Next, the external device control unit 35 transmits a light-source change-over signal (Step ST9). Here, the external device control unit 35 transmits a first-light-source turning-on signal that is a light-source change-over signal for turning on only the first light source 24a through the external communication unit 34 and the communication unit 27b to the light source control unit 27a of the casing 2. Accordingly, the light source control unit 27a, as illustrated in FIG. 11, receives the first-light-source turning-on signal, i.e. the light-source change-over signal (Yes in Step ST27) and turns on only the first light source 24*a* based on the first-light-source turning-on signal (Step ST28). Specifically, the light amount at the time of turning on only the first light source 24*a* is a light amount that is based on the attachment 4 in a case where the light-amount-adjustment signal is received, and is the above-described predetermined light amount in a case where the light-amount-adjustment signal has not been received.

Next, the external device control unit 35, as illustrated in FIG. 10, performs image capturing using the image capturing unit 31 at the time of turning on only the first light source 24*a* (Step ST10). Here, the external device control unit 35 determines whether or not the image capture condition (the image capture condition of a case where the attachment 4 is used) included in the acquired attachment information among the image capture conditions of the image capturing unit 31 is different from the image capture condition in the attachment-not-using state, and changes the image capture condition to an image capture condition that is based on the attachment information when the image capture conditions are different from each other. In a case where the attachment information is acquired, when the exposure time in the attachment-not-using state, for example, is set to one second, and the exposure time included in the attachment information, for example, the exposure time in the attachment-not-using state is set to +α seconds, the external device control unit 35 causes the image capturing unit 31 to capture the medium P2 with an exposure time of 1+α seconds. In a case where the attachment information has not been acquired, the external device control unit 35 causes the image capturing unit 31 to capture the medium P1 with an exposure time of one second.

Next, the image processor 33 generates first image data D1 in which a reflection Pa corresponding to the first light source 24*a* occurs. In addition, at the time of generating the first image data, an image that is based on the first image data D1 may be displayed on the display unit 32. In addition, the light source control unit 27*a*, as illustrated in FIG. 11, repeats determining whether or not a light-source change-over signal has been received (Step ST29) until a second-light-source turning-on signal to be described later is received, waits until the second-light-source turning-on signal is received, and maintains the turning-on of the first light source 24*a*.

Next, the external device control unit 35, as illustrated in FIG. 10, transmits the light-source change-over signal (Step ST11). Here, the external device control unit 35 transmits a second-light-source turning-on signal that is the light-source change-over signal for turning on only the second light source 24*b* to the light source control unit 27*a*. Accordingly, the light source control unit 27*a*, as illustrated in FIG. 11, receives the second-light-source turning-on signal, i.e. the light-source change-over signal (Yes in Step ST29), turns off the first light source 24*a* based on the second-light-source turning-on signal, and turns on only the second light source 24*b* (Step ST30). Specifically, the light amount when only the second light source 24*b* is turned on is a light amount that is based on the attachment 4 in a case where the light-amount-adjustment signal has been received, and is the above-described predetermined light amount in a case where the light-amount-adjustment signal has not been received.

Next, the external device control unit 35, as illustrated in FIG. 10, performs image capturing using the image capturing unit 31 at the time of turning on only the second light source 24*b* (Step ST12). Here, similar to the image capturing using the image capturing unit 31 at the time of turning on only the first light source 24*a* described above, the external device control unit 35 determines whether or not the image capture condition (the image capture condition when the attachment 4 is used) included in the attachment information acquired among the image capture conditions of the image capturing unit 31 is different from the image capture condition in the attachment-not-using state, and changes the image capture condition to an image capture condition that is based on the attachment information in a case where the image capture conditions are different from each other.

Next, the image processor 33 generates second image data D2 in which a reflection Pb corresponding to the second light source 24*b* occurs. Further, at the time of generating the second image data, an image that is based on the second image data D2 may be displayed on the display unit 32. In addition, the light source control unit 27*a*, as illustrated in FIG. 11, repeats determining whether or not a light-source change-over signal has been received (Step ST31) until an all-light-source turning-off signal to be described later is received, waits until the all-light-source turning-off signal is received, and maintains the turning-on of the second light source 24*b*.

Next, the external device control unit 35, as illustrated in FIG. 10, transmits the light-source change-over signal (Step ST13). Here, the external device control unit 35 transmits an all-light-source turning-off signal that is the light-source change-over signal for turning off the second light source 24*b* to the light source control unit 27*a*. Accordingly, the light source control unit 27*a*, as illustrated in FIG. 11, receives the all-light-source turning-off signal, i.e. the light-source change-over signal (Yes in Step ST31), turns off the second light source 24*b* based on the all-light source turning-off signal, and turns off all the plurality of the light sources 24 (Step ST32).

Next, the external device control unit 35 causes the image processor 33 to perform image processing (Step ST14). Here, the image processor 33 mainly generates composite image data DG and corrects the composite image data DG. First, the image processor 33, as illustrated in FIG. 12, corrects the exposure of the image data (Step ST141). Here, the image processor 33 corrects the exposure of at least one piece of the image data D1 and D2 such that a contrast difference between the image data D1 and D2 decreases. Accordingly, a contrast difference occurring in the composite image data DG generated from the image data D1 and D2 with the center line CL as the boundary thereof can be suppressed.

Next, the image processor 33 generates the composite image data DG (image data DP) (Step ST142). Here, the image processor 33, as described above, as illustrated in FIG. 9, generates the composite image data DG from the image data D1 and D2.

Next, the image processor 33, as illustrated in FIG. 12, performs smoothing of the boundary (Step ST143). Here, the image processor 33, as illustrated in FIG. 9, performs at least any one of known smoothing processes such as a rectangular composition process and a feathering process for the boundary of the composite image data DG, i.e. pixel data near the center line CL, thereby performing smoothing near the center line CL. Accordingly, it can be suppressed that the composite image data DG is recognized to have been generated by composing two pieces of the image data D1 and D2 with the center line CL of the composite image data DG being interposed therebetween.

Next, the image processor 33 performs a mirroring correction (Step ST144). Since the image of the medium P is captured by the image capturing unit 31 from the second opening portion 43 or the casing-opening portion 22 through the mirror 25, the image data generated by the image processor 33 is based on a mirror image that is vertically reversed. Thus, in order to vertically reverse the composite image data DG, the image processor 33 performs a known mirroring correction.

Next, the image processor 33 performs a perspective transform (Step ST145). Since the image of the medium P is captured by the image capturing unit 31 from the second opening portion 43 or the casing-opening portion 22 through the mirror 25, even in a case where the second opening portion 43 or the casing-opening portion 22 has a rectangular shape, the second opening portion 43 or the casing-opening portion 22 is seen to be in a trapezoidal shape in the image capturing unit 31. Accordingly, rectangular image on the medium P1 or P2 is trapezoid in the image data that is generated by the image processor 33. Thus, the image processor 33, for example, sets a deformation amount of corresponding images in the image data DP with respect to the image on the medium P1 or P2 based on the positional relation between the image capturing unit 31, the mirror 25, and the second opening portion 43 or the casing-opening portion 22 and performs a known perspective transform based on the deformation amount.

Next, the image processor 33 performs rectangular cropping (Step ST146). Here, the image processor 33 performs known rectangular cropping capable of extracting area corresponding to the reading target area Pt1 or Pt2 in the composite image data DG, for example, based on a contrast difference between the areas corresponding to the reading target area Pt1 or Pt2 and the other areas or the like. Accordingly, the image processor 33 generates image data DP that is configured by only the area corresponding to the reading target area Pt1 or Pt2.

Next, the image processor 33 performs a gamma correction (Step ST147). Here, the image processor 33 performs known gamma correction according to the characteristics of the display unit 32 or the characteristics of a standard display unit for the image data DP.

Next, the external device control unit 35 adds the tag information T to the generated image data DP (Step ST15). Here, the external device control unit 35, as illustrated in FIGS. 13 and 14, adds tag information T1 or T2 to the image data DP2 generated in the attachment-using state or the image data DP1 generated in the attachment-not-using state. In the added tag information T1 or T2, as illustrated in FIG. 14, there are cases where the values of each item of the image data DP2 generated in the attachment-using state and the image data DP1 generated in the attachment-not-using state are different from each other. The reason for this is that, in the tag information T2 added to the image data DP2 that is generated in the attachment-using state, for example, the resolution, the image capture size, the image capture range, the exposure time, the light amount, and the like of the image reading apparatus 1A change in accordance with the acquisition of the attachment information. Accordingly, the tag information T1 or T2 is added to the image data DP, and, the tag information T1 or T2 changes based on the attachment information for the image data DP generated in the attachment-using state. Accordingly, the user handling the image data DP can acquire detailed information of the image data DP for each piece of image data DP generated by the image reading apparatus 1A.

Next, the external device control unit 35 displays an image that is based on the image data DP on the display unit 32 (Step ST16). The external device 3 according to this embodiment displays an image that is based on the image data DP for which various processes have been performed.

Next, the external device control unit 35 stores the image data DP (Step ST17). The external device control unit 35 according to this embodiment stores the image data DP for which various processes have been performed in the memory unit 37.

In addition, it is preferable that the reading application enables, by operating icons that are displayed on the display unit 32, to execute or not to execute each of the boundary smoothing, each correction, and the rectangular cropping and to perform various settings thereof. Furthermore, it is preferable that the storing of the image data DP in the memory unit 37 be instructed by the user by operating icons that are displayed on the display unit 32 by the reading application.

As described above, since the image reading apparatus 1A according to this embodiment performs image capturing of the medium P through the second opening portion 43 or the casing-opening portion 22, the medium P is not conveyed, nor the image capturing unit 31 moves while being in contact with the medium P, whereby a damage of the medium P can be reduced. In addition, with respect to the medium P, by manually placing the image reading apparatus 1A over the medium, the image data (the first image data D1, the second image data D2, and the composite image data DG) can be generated. Accordingly, since the image data DP can be generated by moving the image reading apparatus 1A to the medium P, the medium P can be converted into the image data DP in a simple manner. Further, in the attachment-using state, by bringing the attachment 4 into close contact with the medium P, or in the attachment-not-using state, by bringing the casing 2 into close contact with the medium P, the ambient light irradiating the inside can be cut off. Accordingly, since the image capturing unit 31 can perform the image capturing of the medium P by using only light emitted from the plurality of the light sources 24, a deterioration in the image quality due to the influence of external disturbances can be suppressed, and accordingly, the image data having high image quality can be generated.

In addition, in each image capturing process performed by the image capturing unit 31, since light is emitted to different areas (main irradiation regions La and Lb) on each of horizontal planes in the casing-opening portion 22 and the second opening portion 43, the reflections (the reflections Pa and Pb) do not occur in the same area in the generated image data (the first image data D1 and the second image data D2). Accordingly, in each of the image data D1 and D2, by extracting an area in which the reflection of the first light source 24a or the second light source 24b does not occur to generate the composite image data DG (image data DP), the area in which the reflection of the image data DP occurs can be excluded. Therefore, since the composite image data DG is configured by areas of the image data D1 and D2 having high image quality, the image data DP having high image quality can be generated.

In addition, since the external device 3 is attachable to or detachable from the casing 2, the image capturing unit 31 and the display unit 32 can be detached from the casing 2 as well. Accordingly, instead of arranging the image capturing unit 31 and the display unit 32 on the casing 2 side, the image reading apparatus 1A can be configured by using the existing external device 3 that is owned by the user. Therefore, the configuration of the casing 2 can be simplified, and accordingly, the manufacturing cost of the casing 2 can be reduced. Specifically, since the casing 2 does not include the image capturing unit 31 and the display unit 32 that are electronic components, the occurrence rate of breakdown or the like can be reduced, whereby the durability is improved.

In addition, according to the image reading apparatus 1A, since the attachment 4 is attachable to or detachable from the casing 2, compared to the attachment-not-using state, the image capture environments including the image capture conditions, the turning-on conditions, and the like can be changed by using the attachment 4. The image reading apparatus 1A according to this embodiment can enlarge the image capture range S in the attachment-using state compared to that of the attachment-not-using state. In addition, in the image reading apparatus 1A according to the embodiment, even when the image capture environment changes in accordance with the use of the attachment 4, the control of the image capturing unit 31 and the plurality of the light sources 24 can be automatically changed in accordance with the changed image capture environment based on the attachment information of the attachment 4 as attached. Accordingly, the user can easily change the image capture environment by attaching the attachment 4 to or detaching the attachment 4 from the casing 2.

Second Embodiment

Figure 15:
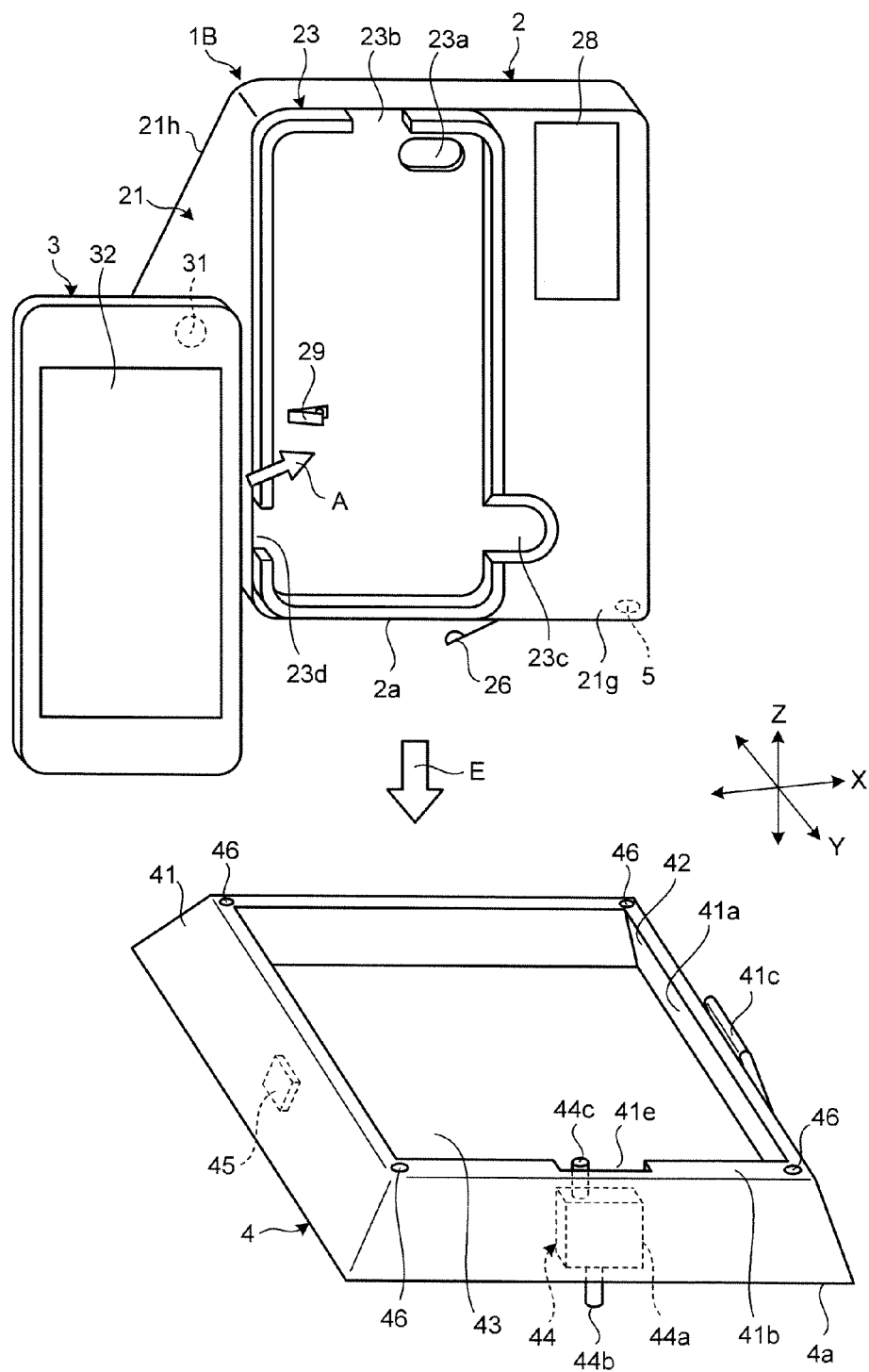
FIG. 15 is an external view of an image reading apparatus according to a second embodiment.

Next, an image reading apparatus according to a second embodiment will be described. FIG. 15 is an external view of the image reading apparatus according to the second embodiment. A difference between an image reading apparatus 1B according to the second embodiment and the image reading apparatus 1A according to the first embodiment, as illustrated in FIG. 15, is the attachment structure of the attachment 4 for the casing 2. The basic configuration of the image reading apparatus 1B is almost the same as that of the image reading apparatus 1A, and thus, explanation of the same reference numeral will not be presented or will be simplified.

In the image reading apparatus 1B, the attachment 4 is attachable to or detachable from the casing 2 using a magnetic force. At the bottom 2a of the casing 2 and on the face of the attachment 4 that faces the bottom 4a, magnets formed using magnetite or the like and magnetic materials formed using iron are arranged. In this embodiment, on the periphery of the first opening portion 42 of the attachment 4, a plurality of magnets 46 are attached, and, at the bottom 2a of the casing 2, magnetic materials 5 corresponding to the magnets 46 are arranged. Accordingly, when the attachment 4 is used, with each magnetic material 5 facing each magnet 46, as denoted by arrow E illustrated in the figure, the casing 2 and the attachment 4 approach each other, and the attachment 4 is attached to the casing 2 depending on the magnetic force. Therefore, the attachment 4 can be attached to the casing 2 in a detachable manner with a simple configuration. In addition, in order to position the attachment 4 with respect to the casing 2, as illustrated in the figure, a hook portion 41c may be arranged.

In the first and second embodiments, while the casing control unit 27 that is an attachment state detecting unit acquires the attachment information from the memory unit 37 by acquiring an identification number stored in the identification chip 45, the present invention is not limited thereto.

For example, it may be configured such that a resistor having a resistance value different for each type of the attachment 4 is attached to the attachment 4, and power is supplied to the resistor from the casing 2 in the attachment-using state. In such a case, the casing control unit 27 outputs an output signal that is based on the voltage value, which changes, of the voltage across the resistor to the external device control unit 35, and, based on the voltage value, the external device control unit 35 acquires attachment information corresponding to an identification number stored in the memory unit 37 based on the relation between the current value and the identification number of the attachment 4 that is stored in the memory unit 37 in advance.

Alternatively, on a face that faces the bottom 2a of the casing 2 in the attachment-using state, an identification chart (a two-dimensional barcode, a matrix-type two-dimensional barcode, or the like) is arranged for each type of the attachment 4, and in a portion of the bottom 2a of the casing 2 that faces the identification chart, an optical sensor that detects the identification chart may be arranged. In such a case, the casing control unit 27 outputs an output signal corresponding to the identification number that is based on the identification chart detected by the optical sensor to the external device control unit 35, and the external device control unit 35 acquires attachment information corresponding to the identification number stored in the memory unit 37 based on the output signal.

Alternatively, in a case where only one type of the attachment 4 is present, at the bottom 2a of the casing 2, a mechanical attachment sensor having an arm which is deformed when the arm is pressed by the attachment 4 may be attached. Different from the landing sensor 26, this mechanical attachment sensor is turned on when the arm is pressed and deformed. In such a case, as the attachment sensor is turned on in the attachment-using state, the casing control unit 27 outputs an output signal corresponding to the turning-on of the attachment sensor to the external device control unit 35, and the external device control unit 35 acquires attachment information stored in the memory unit 37 based on the output signal.

Figure 16:
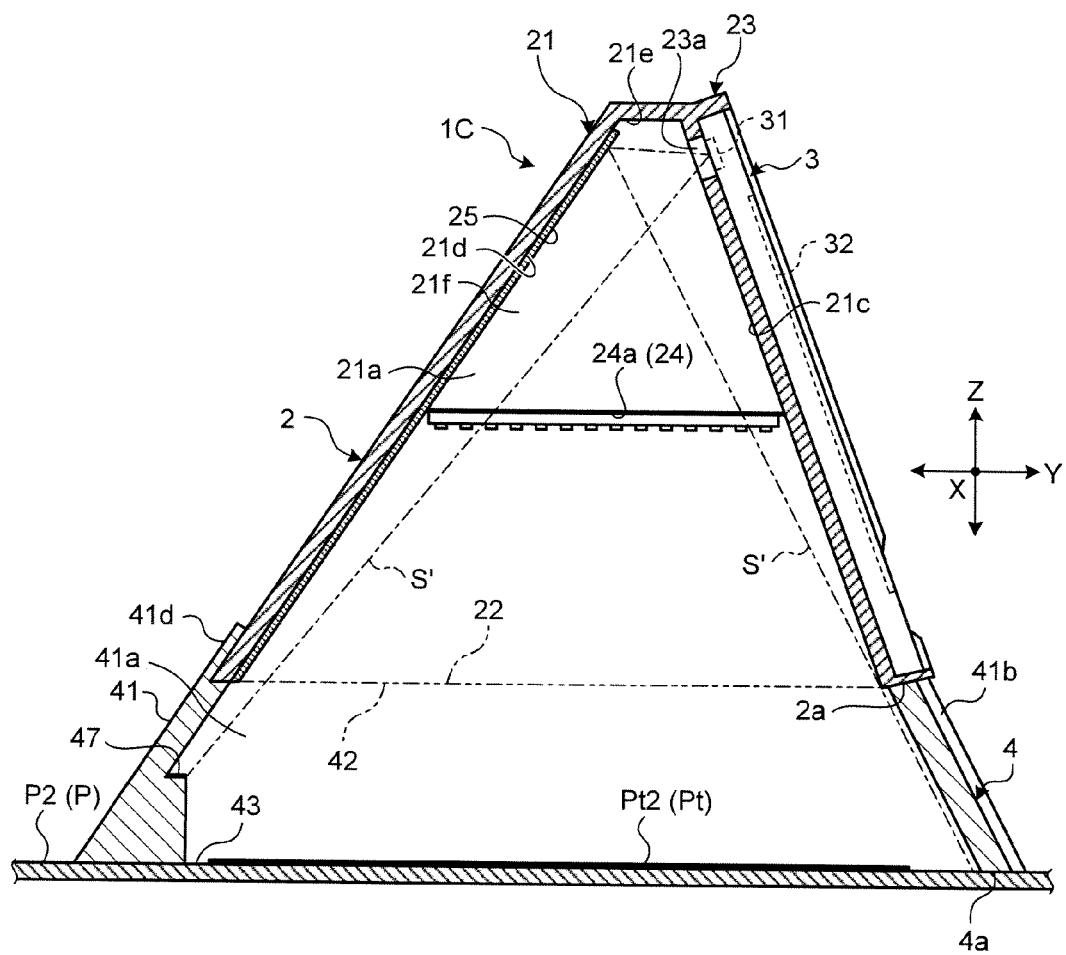
FIG. 16 is a diagram that illustrates the attachment-using state of an image reading apparatus according to another embodiment.
Figure 17:
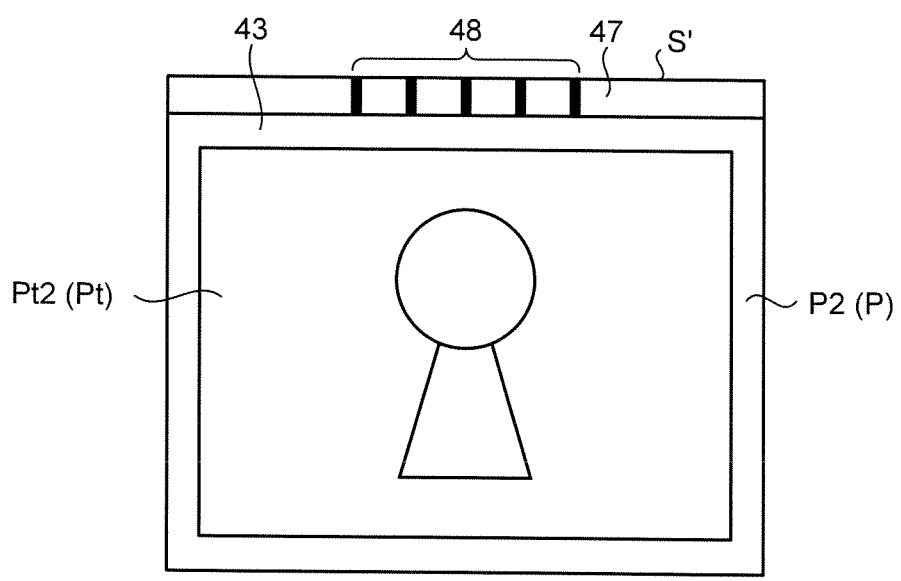
FIG. 17 is a diagram that illustrates an image capture range in the attachment-using state.

FIG. 16 is a diagram that illustrates the attachment-using state of an image reading apparatus according to another embodiment. FIG. 17 is a diagram that illustrates an image capture range in the attachment-using state. As illustrated in FIG. 16, it may be configured such that an image reading apparatus 1C is formed such that, in the attachment-using state, at least a part of the inner wall of the main body unit 41 is included in the image capture range S' of the image capturing unit 31, and, as illustrated in FIG. 17, an identification chart 48 is arranged on an inner wall 47 included in the image capture range S°. In such a case, the external device control unit 35 serves as an attachment state detecting unit, and the identification number of the attached attachment 4 is determined from an image that corresponds to the identification chart 48 included in the image data DP generated at the time of turning on all light sources described above and acquires attachment information corresponding to the identification number stored in the memory unit 37. Accordingly, it can be suppressed that a sensor used for detecting information relating to an identification number arranged in the attachment 4 is newly arranged so as to acquire the attachment information. In addition, the external device control unit 35 may not display the part of the inner wall 47 out of the image capture range S' on the display unit 32.

Alternatively, while the power supply unit 28 is included in the casing 2 according to each embodiment described above, power may be configured to be supplied from an external power supply of the casing 2 to each device of the casing 2. The external power supply includes a commercial power supply, solar power, the power supply unit 36 installed to the external device 3, and the like.

Furthermore, in each embodiment described above, while the first light source 24a and the second light source 24b are disposed on the one pair of the inner side faces 21a and 21b facing each other, the present invention is not limited thereto as long as the main irradiation regions La and Lb facing each other do not overlap each other. For example, the attachment heights of the first light source 24a and the second light source 24b may be changed by adjusting the optical axes thereof in the same face (the inner side face 21a or 21b or the exposing face 21c) or may be attached at the same height in a parallel manner. In addition, by changing the optical axes of a plurality of light emitting devices that configure the light source 24, main irradiation regions La and Lb not overlapping each other may be realized using one light source 24.

In addition, in each embodiment described above, while a case has been described in which two light sources are present as the plurality of light sources 24, three or more light sources may be arranged as long as light can be emitted to different areas on each of horizontal planes in the casing-opening portion 22 and the second opening portion 43. In such a case, the image capturing unit 31 performs image capturing of the medium P through the second opening portion 43 or the casing-opening portion 22 for turning-on of each light source, and the number of pieces of the generated image data is the number of the light sources, the image processor 33 extracts areas in which a reflection does not occur from each piece of image data and generates composite image data DG. Alternatively, in each embodiment described above, while a case has been described in which only one of the plurality of light sources 24 is turned on for each image capturing process performed by the image capturing unit 31, a plurality of light sources may be simultaneously turned on as long as light can be emitted to different areas on each of horizontal planes in the casing-opening portion 22 and the second opening portion 43. In addition, while a case has been described in which all the plurality of light sources 24 are turned on when the landing sensor 26 is turned on, at least one or more light sources may be turned on.

Furthermore, in each embodiment described above, while the attachment 4 that can enlarge the image capture range S has been described, the present invention is not limited thereto. Thus, an attachment 4 configured to reduce the image capture range to be smaller than the image capture range S in the attachment-not-using state may be used. In addition, the attachment 4 having a filter such as a polarizing filter or a color filter arranged on the inside 41a of the main body may be used.

In addition, the identification chip 45 or the identification chart 48 according to each embodiment described above may be configured to store not only the identification number of the attachment 4 but also the attachment information. In such a case, the attachment information does not need to be stored in the memory unit 37 of the external device 3 in advance, and accordingly, the external device control unit 35 may acquire the attachment information simultaneously with the acquisition of the identification number.

An image reading apparatus according to the present invention has advantages that a damage in a medium is suppressed, the medium can be converted into image data in an easy manner, and the image data having high image quality can be generated. Specifically, by using an attachment, for example, the image capture range or the image capturing status of the image capturing unit can be changed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    a casing configured to cut off ambient light and have a casing-opening portion at the bottom;
    an image capturing unit configured to perform image capturing of a medium that is exposed to an inside of the casing in the casing-opening portion;
    a plurality of light sources configured to be arranged on the inside of the casing and emit light to different areas on horizontal plane in the casing-opening portion;
    a control unit configured to control at least the image capturing unit and the plurality of light sources; and
    an attachment configured to be detachably attached to the bottom of the casing,
    wherein the attachment surrounds the casing-opening portion in a state in which the attachment is attached to the casing and cuts off the ambient light together with the casing in a state in which the bottom is placed on the medium.

2. The image reading apparatus according to claim 1,
    wherein the attachment includes a second opening portion that is formed at the bottom and a first opening portion that communicates with the casing-opening portion, and
    wherein a relation between the height of the attachment and the area of the second opening portion is determined based on an angle of view of the image capturing unit such that the second opening portion is included in an image capturable area.

3. The image reading apparatus according to claim 1, further comprising an attachment state detecting unit configured to detect attaching of the attachment to the casing,
    wherein the control unit, in a case where the attaching of the attachment to the casing is detected, changes at least one of an image capture condition of the image capturing unit and turning-on conditions of the plurality of light sources based on information of the attachment that is acquired by the attaching of the attachment to the casing.

4. The image reading apparatus according to claim 1, further comprising a tag information adding unit configured to add tag information including image capture information that is information at a time of image capturing performed by the image capturing unit to image data corresponding to the medium, the image data being generated by image capturing of the medium performed by the image capturing unit,
    wherein the tag information adding unit adds the tag information that is changed based on the information of the attachment that is acquired by the attaching of the attachment to the casing to the image data generated by image capturing of the medium performed by the image capturing unit in a state in which the attachment is attached to the casing.

5. The image reading apparatus according to claim 3, wherein the control unit acquires the information of the attachment that is stored in advance based on an output signal output from the attachment state detecting unit.

6. The image reading apparatus according to claim 3,
    wherein a plurality of types of the attachment is attachable to or detachable from the casing, and
    wherein the information of the attachment is different based on the attachment.

7. The image reading apparatus according to claim 4,
    wherein a plurality of types of the attachment is attachable to or detachable from the casing, and
    wherein the information of the attachment is different based on the attachment.

* * * * *